(12) United States Patent
Saito et al.

(10) Patent No.: US 6,192,021 B1
(45) Date of Patent: Feb. 20, 2001

(54) OPTICAL PICKUP APPARATUS

(75) Inventors: Shinichiro Saito; Norikazu Arai; Hiroyuki Yamazaki, all of Hachioji (JP)

(73) Assignee: Konica Corporation, Tokyo (JP)

(*) Notice: Under 35 U.S.C. 154(b), the term of this patent shall be extended for 0 days.

(21) Appl. No.: 09/062,712

(22) Filed: Apr. 20, 1998

(30) Foreign Application Priority Data

Apr. 21, 1997 (JP) .................................................. 9-103203
Sep. 9, 1997 (JP) .................................................. 9-243936

(51) Int. Cl.$^7$ .................................................. G11B 7/00
(52) U.S. Cl. .................................................. 369/112; 369/54
(58) Field of Search .................................................. 369/54, 58, 94, 369/112, 109, 110, 103

(56) References Cited

U.S. PATENT DOCUMENTS 5,703,856 * 12/1997 Hayashi et al. ............................ 369/54
5,966,362 * 10/1999 Arai et al. ................................ 369/112

FOREIGN PATENT DOCUMENTS

| 0 732 458 A1 | 9/1996 | (EP) . |
| 0 747 893 A2 | 12/1996 | (EP) . |
| 0 762 403 A2 | 3/1997 | (EP) . |
| 8-55363 | 2/1996 | (JP) . |
| 9-184975 | 7/1997 | (JP) . |

OTHER PUBLICATIONS

Dec. 1, 1998, European Search Report.

Lecture No. OFA3–1, "A Compact Disc Compatible Digital Video Disc Pickup Using Annular Mask," International Symposium on Optical Memory and Optical Data Storage, 1996.

* cited by examiner

*Primary Examiner*—Paul W. Huber
(74) *Attorney, Agent, or Firm*—Finnegan, Henderson, Farabow, Garrett, & Dunner, L.L.P.

(57) ABSTRACT

An optical pickup apparatus for performing a reading or recording operation of information on one of different kinds of optical information recording medium, each having a transparent base board in different thickness. The optical pickup apparatus includes: a laser beam generator; a light converging optical system for converging luminous flux from the laser beam generator through the transparent base board onto an information recording surface of the optical information recording medium. In the optical pickup apparatus, the light converging optical system includes an objective lens and divides a light flux from the laser beam generator into at least two areas in a direction perpendicular to the optical axis; the different kinds of optical information recording medium includes a first optical information recording medium, having a transparent base board with a thickness t1, and a second optical information recording medium, having a transparent base board with a thickness t2; and magnification m2 of the objective lens, viewed from the second optical information recording medium, is smaller than magnification m1 of the objective lens, viewed from the first optical information recording medium side.

28 Claims, 23 Drawing Sheets

SPHERICAL ABERRATION

SPHERICAL ABERRATION

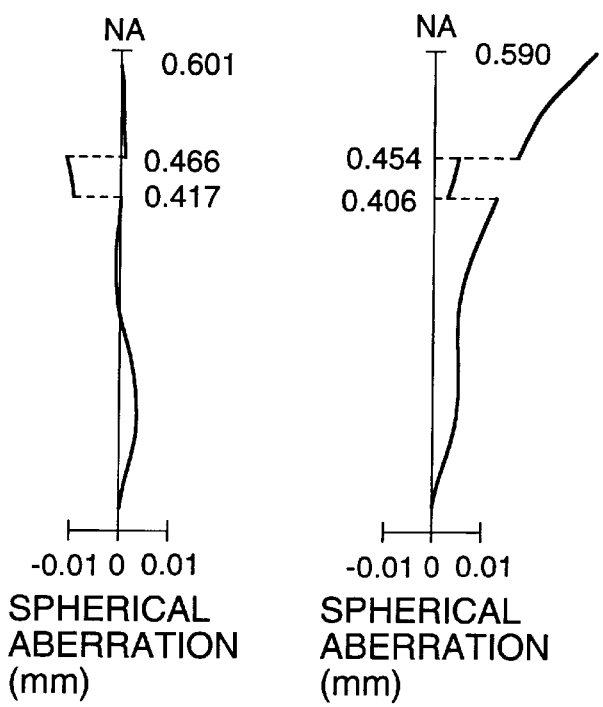
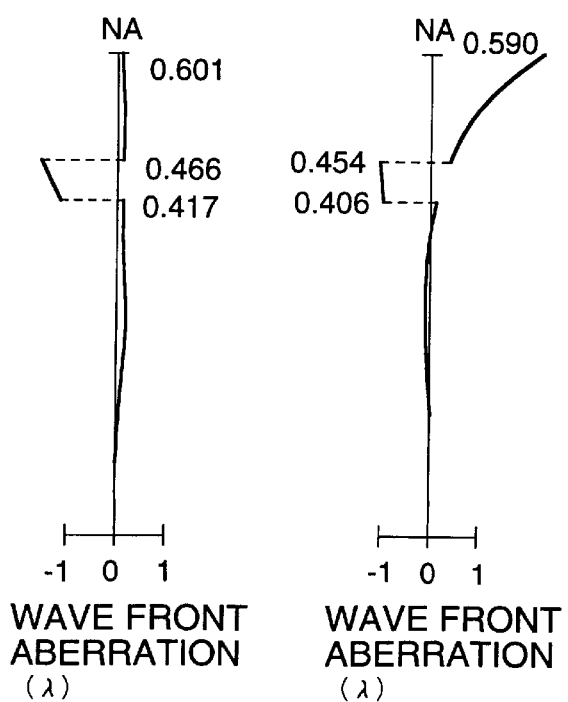

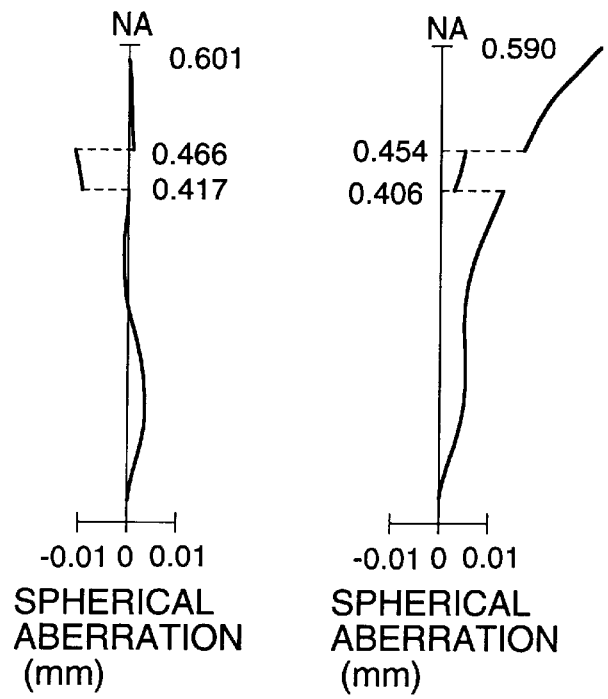
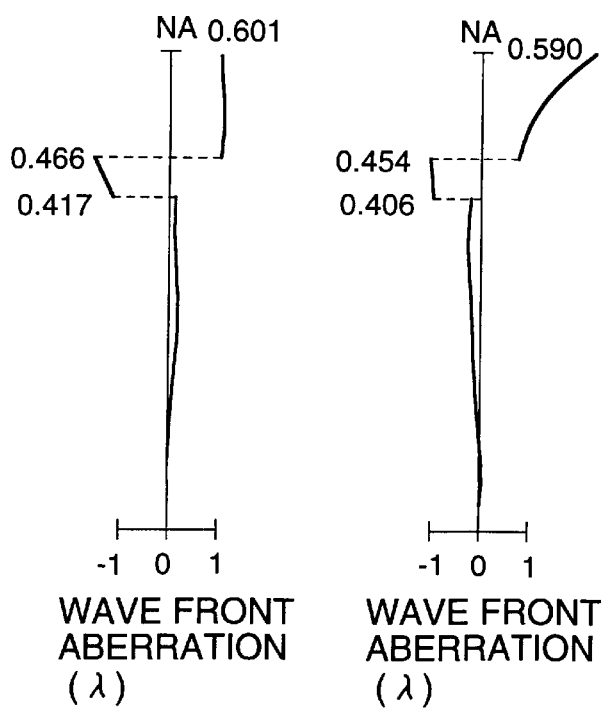

FIG. 10 (a) FIG. 10 (b)
FIG. 10 (c) FIG. 10 (d)
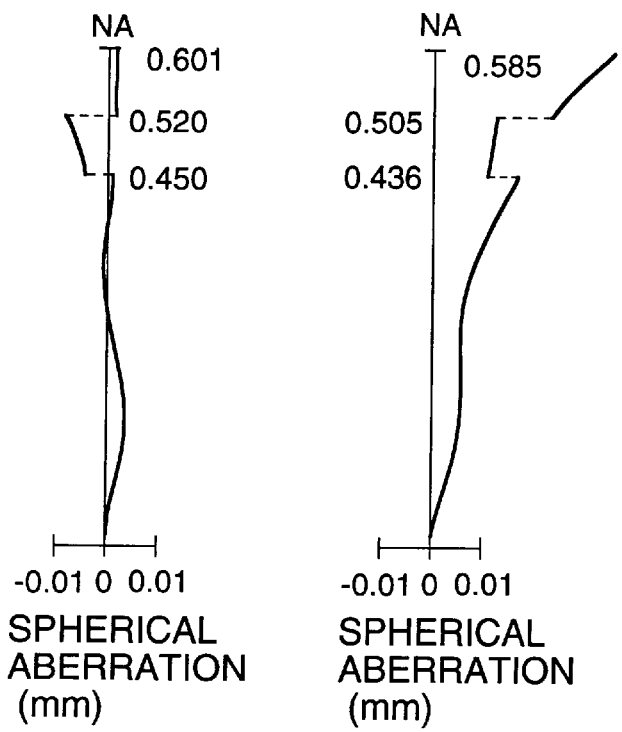
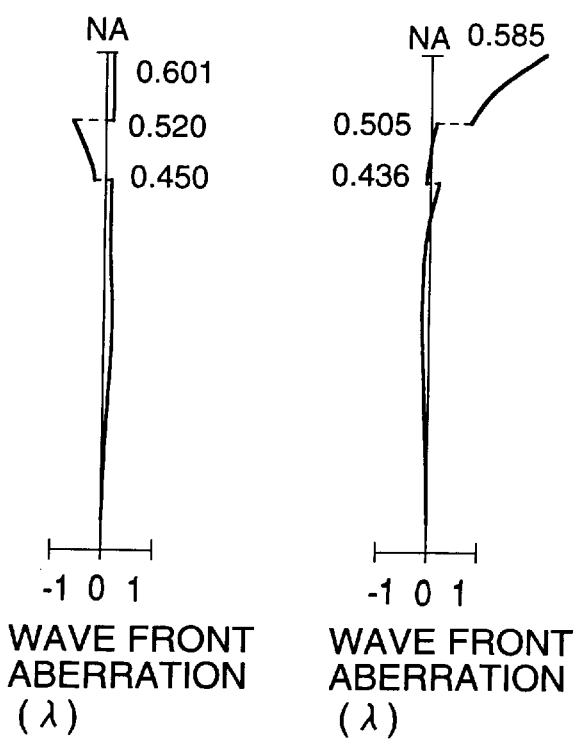

-0.01  0  +0.01 (mm)

-0.1  0  +0.1 (mm)

OPTICAL PICKUP APPARATUS

BACKGROUND OF THE INVENTION

The present invention relates to an optical pickup apparatus capable of conducting recording and/or reading (recording/reading) for plural optical information recording media each having a transparent base board differing in terms of thickness from others.

TABLE 1

| Optical disk | Thickness of transparent base board (mm) | Necessary numerical aperture NA (light source wavelength $\lambda$ nm) |
| --- | --- | --- |
| CD, CD-R (reading only) | 1.20 | 0.45 ($\lambda$ = 780) |
| CD-R (recording and reading) | 1.20 | 0.50 ($\lambda$ = 780) |
| LD | 1.25 | 0.50 ($\lambda$ = 780) |
| MD | 1.20 | 0.45 ($\lambda$ = 780) |
| MO (ISO3.52 inch, 230 MB) | 1.20 | 0.55 ($\lambda$ = 780) |
| MO (ISO3.52 inch, 640 MB) | 1.20 | 0.55 ($\lambda$ = 680) |
| DVD | 0.60 | 0.60 ($\lambda$ = 635) |

Incidentally, though light source wavelength $\lambda$ needs to be 780 (nm) for CD-R, other optical disks can employ light sources having wavelengths other than those described in Table 1, and in this case, necessary numerical aperture NA varies depending on light source wavelength $\lambda$ used. For example, in the case of CD, the necessary numerical aperture NA approximates $\lambda$ ($\mu$m)/1.73 while in the case of DVD, the necessary numerical aperture NA approximates $\lambda$ ($\mu$m)/1.06.

As stated above, various optical disks each having its own size, base board thickness, recording density and wavelength used which differ from others are available on the market now, and there have been proposed optical pickup apparatuses each being capable of handling various optical disks.

As one of them, there has been proposed an optical pickup apparatus wherein there are provided converging optical systems corresponding to different optical disks which are switched depending on the optical disk to be reproduced. This optical pickup apparatus, however, requires plural optical pickup apparatuses, and thereby brings about high cost and requires a driving mechanism for switching optical pickup apparatuses, resulting in a complicated apparatus requiring its high accuracy for switching, which is not preferable.

With a background stated above, there have been made proposals to reproduce plural disks with one converging optical system, and for example, there has been proposed an optical pickup apparatus wherein an image-forming spot for DVD and that for CD are arranged so that each of their wave front aberrations is not higher than 0.01 $\lambda$ (rms) by optimizing two light sources and sizes of apertures, as described in TOKKAIHEI 8-55363.

As another example, TOKKAIHEI 9-184975 discloses an optical pickup apparatus wherein an objective lens is provided with a slight step which is coaxial with an optical axis of the objective lens. In this optical pickup apparatus, a light flux emitted from a light source is divided into two areas including a first area which is closer to an optical axis than the step and a third area which is outside the step, and a light flux passing through the first area is used for recording/reading of CD and a light flux passing through the first area and the third area is used for recording/reading of DVD, thereby recording/reading for two optical disks including both DVD and CD are performed by one converging optical system (hereinafter the converging optical system is called a 2-area converging optical system and when it is applied to an objective lens, it is called a 2-area objective lens).

In Lecture No. OFA 3-1 at "International symposium on optical memory and optical data storage 1996", there is proposed an optical pickup apparatus wherein a shielding ring which is coaxial with an optical axis of an objective lens is provided. In this pickup apparatus, a light flux emitted from a light source is divided into three areas including a first area which is closer to the optical axis than the shielding ring, a shielding area sectioned by the shielding ring itself, and a third area which is outside the shielding ring, and a light flux passing through the first area is used for recording/reading of CD and a light flux passing through the first area and the third area is used for recording/reading of DVD, thereby recording/reading for two optical disks including both DVD and CD are performed by one converging optical system (hereinafter the converging optical system is called a shielding converging optical system and when it is applied to an objective lens, it is called a shielding objective lens).

The optical pickup apparatus equipped with the 2-area converging optical system or the shielding converging optical system is to make wave front aberration (spherical aberration) to be discontinuous, and thereby to reduce an effect of flare caused by spherical aberration resulting from a thickness difference of a transparent base board between DVD and CD in recording/reading of CD.

In these optical pickup apparatuses, the necessary numerical aperture NA in reading of CD can be as small as it is about 0.367 because one light source with short wavelength ($\lambda$=635 nm) is used, therefore, diffraction limit characteristics can be satisfied and there by DVD and CD can be reproduced. In this case, when intending to use two light sources for coping with CD-R in place of CD, necessary numerical aperture NA for reading of CD-R is required to be 0.45, which means that high NA is needed similarly to the occasion to cope with LD or the like.

However, in the 2-area converging optical system, it is necessary that the designed thickness of a base board is made to be thicker and a position of the step is moved to the high NA area, which, in this case, worsens a spot shape in reading of DVD and makes it impossible to reproduce DVD. In the shielding optical system, diffraction limit characteristics can barely be satisfied with necessary numerical aperture NA=0.367, and when a position of the shielding ring is moved further to the higher NA area, diffraction limit characteristics can not be satisfied, and reading is impossible.

Taking the foregoing into consideration, inventors of the invention have proposed, in TOKUGANHEI 9-197076, an optical pickup apparatus wherein an objective lens is provided with at least two steps coaxial with an optical axis of the objective lens. In this optical pickup apparatus, a light flux emitted from a light source is divided into three areas including a first area which is close to the optical axis, a second area which is outside the first area, and a third area which is outside the second area, and a light flux passing through the first area closer to the optical axis and the second area is used for recording/reading of the second optical disk and a light flux passing through the first area and the third area is used for recording/reading of the first optical disk, thereby recording/reading for plural optical disks are performed by one converging optical system (hereinafter the converging optical system is called a 3-area converging optical system, and when it is applied to an objective lens, it is called a 3-area objective lens).

Further, in the optical pickup apparatus described in TOKUGANHEI 8-55363, light sources are arranged so that wave front aberrations of image-forming spots just for DVD and CD may be 0.01 λ or less, and nothing is considered for the distance from the final refracting surface which is one closest to the optical information recording medium in the converging optical system to the transparent base board of the optical disk (hereinafter referred to also as working distance WD). When the DVD in the case of DVD is different from that in the case of CD, when reproducing at least one type of optical disk, it is necessary to let a driving electric current flow constantly through an actuator which moves an objective lens in the converging optical system for focusing. This causes a problem that there is no escape from high power consumption. There is further a problem that an actuator is required to be large compared with an exclusive actuator for DVD or CD, to secure a movable distance for focusing.

SUMMARY OF THE INVENTION

With a background stated above, an object of the invention is to provide an optical pickup apparatus which can conduct, with one converging optical system, recording/reading of plural optical information recording media each having a different thickness of a transparent base board, and can cope with enhancement to high NA.

Further object of the invention is to conduct properly the recording/reading performed in the first optical disk even when the second optical disk having high NA is subjected to recording/reading. To be concrete, an object of the invention is, when conducting recording/reading for plural optical information recording media each having a different thickness of a transparent base board, with one converging optical system, to make the enhancement to high NA possible without requiring a complicated lens-stop-down mechanism even when a radius of split surface is constant, and thereby to cope with the second optical disk requiring high NA, and to make it possible to reduce a radius of a split surface when obtaining constant NA, and thereby to cope also with the first optical disk requiring much quantity of light.

Further object of the invention is to provide an optical pickup apparatus which is compact and requires less power consumption and is capable of conducting, with one converging optical system, recording/reading of optical disks each having a different thickness of a transparent base board. (1) An optical pickup apparatus in which s converging optical system including an objective lens has a function to divide a light flux emitted from a light source into at least two areas in the direction perpendicular to an optical axis, and a light flux emitted from the first light source (wavelength λ 1 (nm)) is converged by the converging optical system on the information recording surface of the first optical information recording medium having a transparent base board with a thickness of t1 through the transparent base board for recording or reading of information on the first optical information recording medium, and a light flux emitted from the second light source (wavelength λ 2 (nm)) is converged by the converging optical system on the information recording surface of the second optical information recording medium having a transparent base board with a thickness of t2 (t2>t1) through the transparent base board for recording or reading of information on the second optical information recording medium, wherein, magnification m2 of the objective lens viewed from the optical information recording medium side in recording or reading information of the second optical information recording medium is smaller than magnification m1 of the objective lens viewed from the optical information recording medium side in recording or reading information of the first optical information recording medium. (2) An optical pickup apparatus which is structured to converge, with a converging optical system including an objective lens, a light flux emitted from a light source on the information recording surface through a transparent base board of an optical information recording medium for recording or reading of information in the optical information recording medium and conducts recording or reading of information of at least two optical information recording media each having a different thickness of a transparent base board and different recording density, wherein at least one lens-surface-dividing section which is almost coaxial with an optical axis of the lens is provided on the converging optical system to make the wave front aberration to be discontinuous, and for recording or reading of information in the first optical information recording medium having a t1-thick transparent base board, a light flux emitted from the first light source is converged by making the magnification of the objective lens viewed from the optical information recording medium side to be m1 so that that the wave front aberration of a beam spot formed on the information recording surface by a light flux passing through the first area that is closer to the optical axis than the lens-surface-dividing section and the third area that is outside the lens-surface-dividing section may be 0.05 λ 1 (rms) or less (wherein, λ 1 is a wavelength (nm) of the first light source used for recording or reading of information of the first optical information recording medium), while for recording or reading of information in the second optical information recording medium having recording density lower than that of the first optical information recording medium and a t2-thick transparent base board (t2>t1), a light flux emitted from the second light source is converged by making the magnification of the objective lens viewed from the optical information recording medium side to be m2 so that that the wave front aberration of a beam spot formed on the information recording surface by a light flux passing through the first area may be 0.07 λ 2 (rms) or less (wherein, λ 2 is a wavelength (nm) of the second light source used for recording or reading of information of the second optical information recording medium).

BRIEF DESCRIPTION OF THE DRAWINGS

FIGS. 6(a)–6(d) represent a spherical aberration diagram and a wave front aberration diagram in Example 1.

Each of FIGS. 7(a) and 7(b) is a relative intensity distribution diagram of a converged spot in Example 1.

FIGS. 8(a)–8(d) represent a spherical aberration diagram and a wave front aberration diagram in Example 1.

Each of FIGS. 9(a) and 9(b) is a relative intensity distribution diagram of a converged spot in Example 1.

FIGS. 10(a)–10(d) represent a spherical aberration diagram and a wave front aberration diagram in Example 1.

Figure 11:
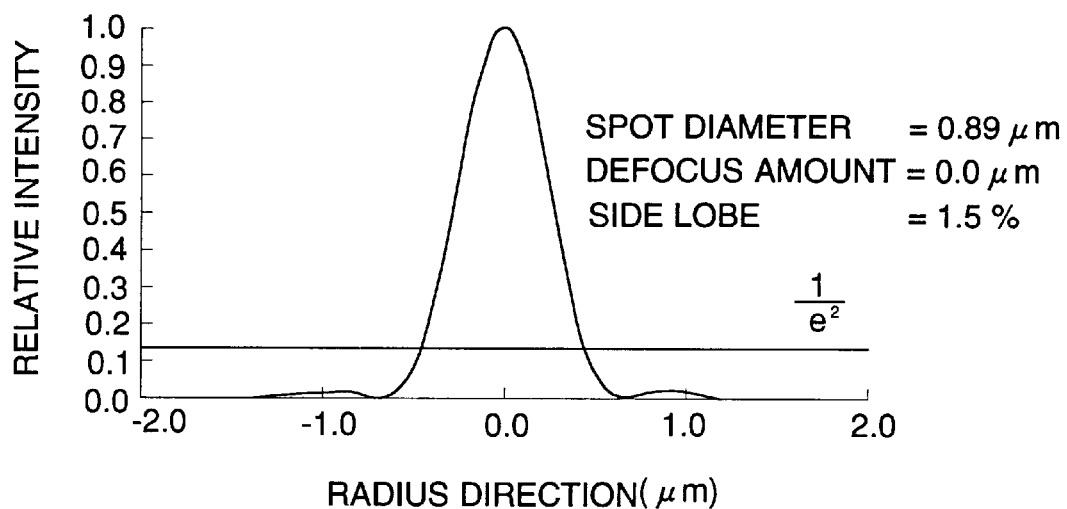
Figure 11:
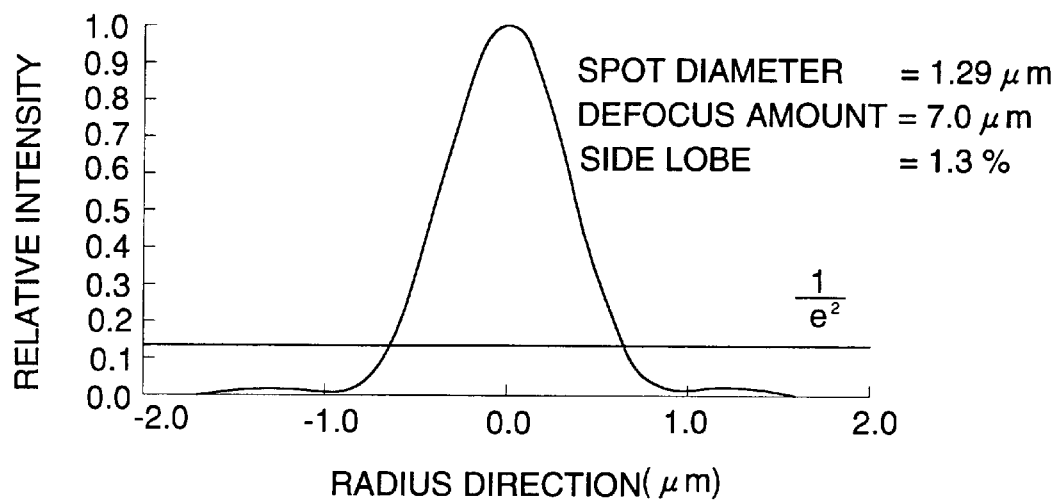

Each of FIGS. 11(a) and 11(b) is a relative intensity distribution diagram of a converged spot in Example 1.

FIGS. 12(a)–12(d) represent a spherical aberration diagram and a wave front aberration diagram in Example 1.

Figure 13:
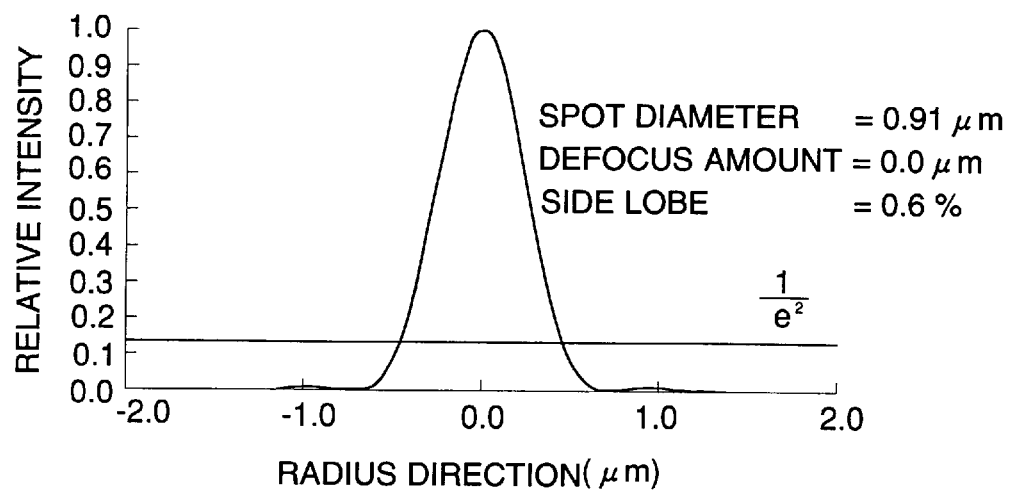
Figure 13:
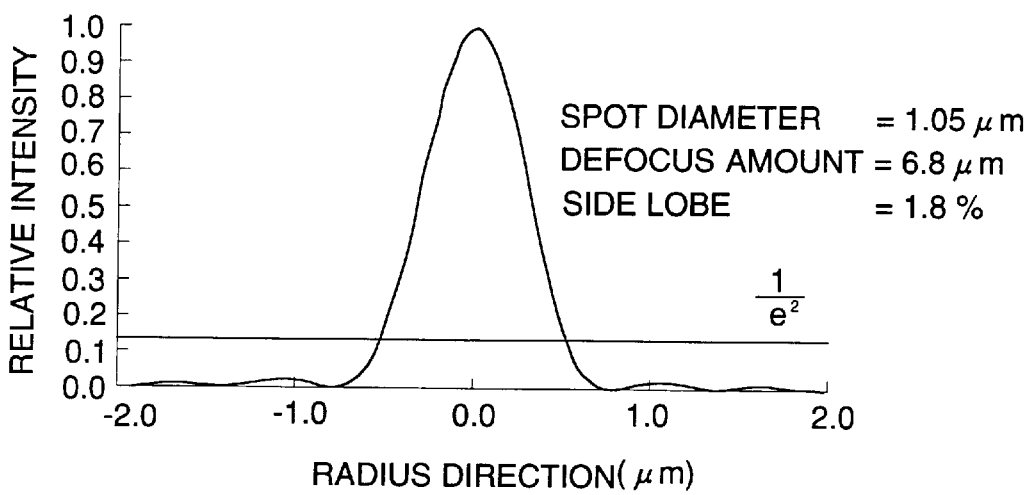

Each of FIGS. 13(a) and 13(b) is a relative intensity distribution diagram of a converged spot in Example 1.

FIGS. 14(a)–14(d) represent a spherical aberration diagram and a wave front aberration diagram in Example 1.

Figure 15:
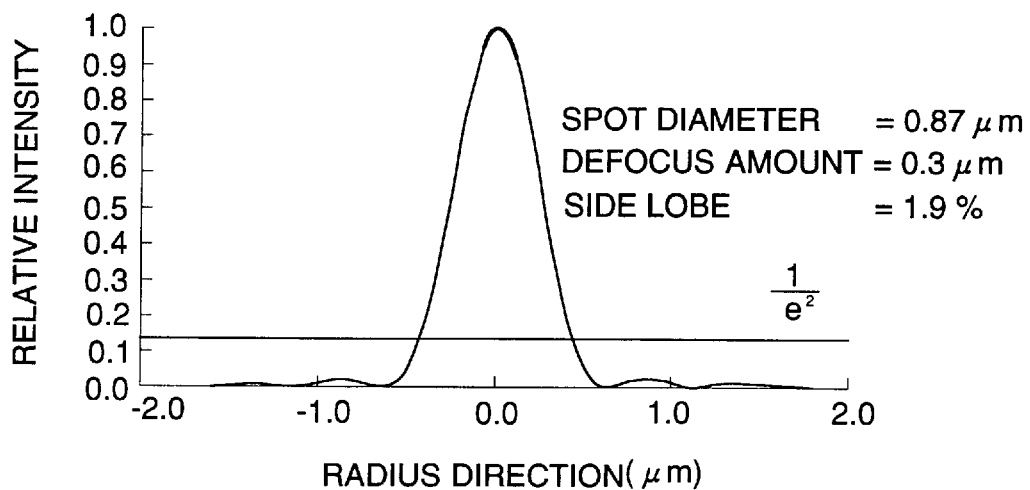
Figure 15:
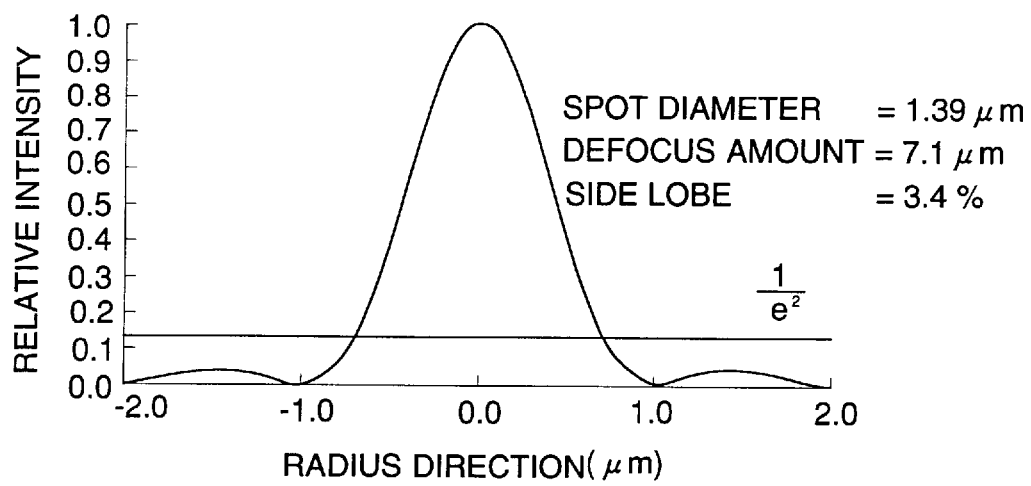

Each of FIGS. 15(a) and 15(b) is a relative intensity distribution diagram of a converged spot in Example 1.

FIGS. 16(a)–16(d) represent a spherical aberration diagram and a wave front aberration diagram in Example 1.

Each of FIGS. 17(a) and 17(b) is a relative intensity distribution diagram of a converged spot in Example 1.

Figure 18:
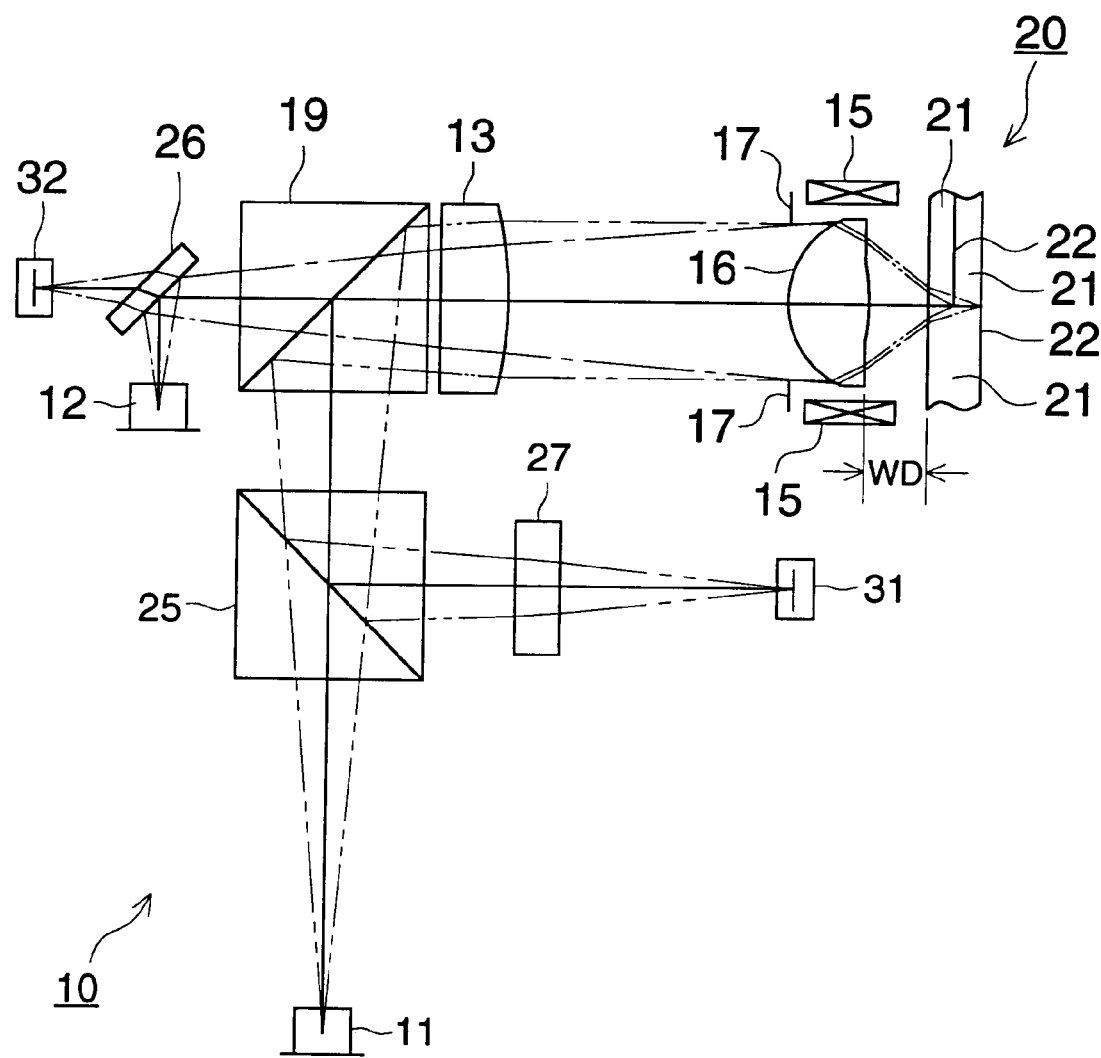

FIG. 18 is a schematic structure diagram of an optical pickup apparatus.

Figure 19:
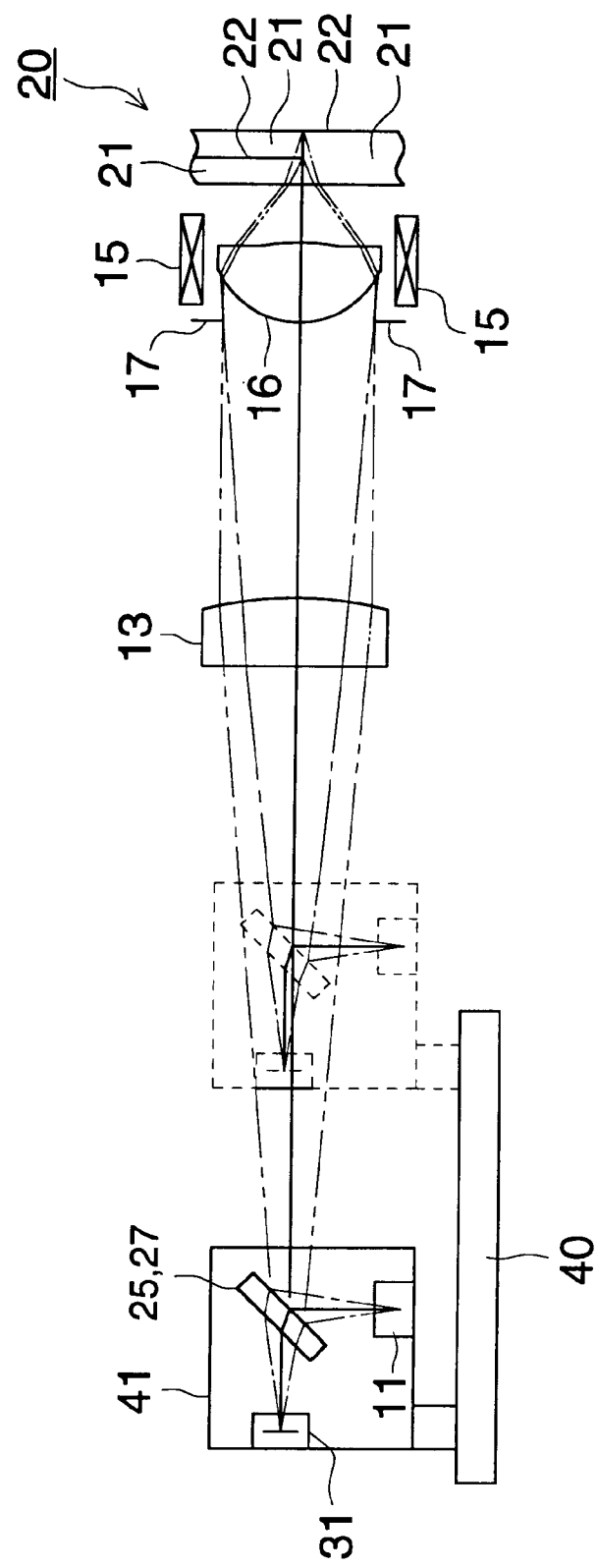

FIG. 19 is a schematic structure diagram of an optical pickup apparatus in the second embodiment where the working distance is constant.

FIGS. 20(a)–20(c) represent a diagram showing an objective lens used favorably in an optical pickup apparatus when the working distance is constant.

Each of FIGS. 21(a) and 21(b) is a diagram of spherical aberration on the information recording surface which is for explaining function of an objective lens.

Figure 22:
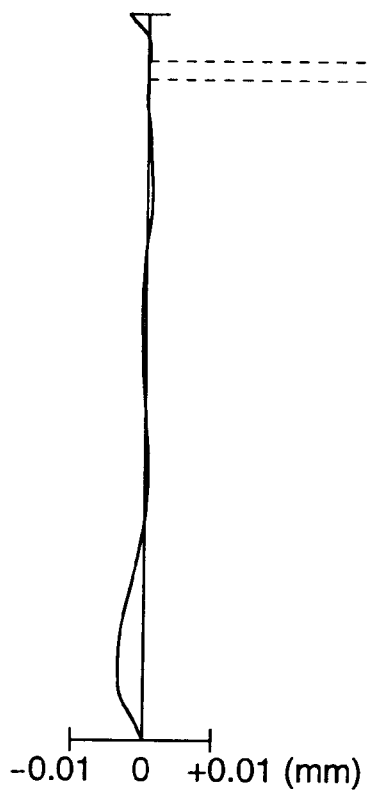
Figure 22:
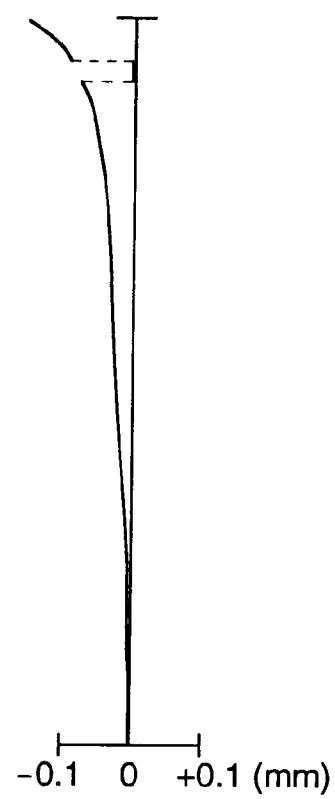

Each of FIGS. 22(a) and 22(b) is a diagram of spherical aberration on the information recording surface in the seventh example.

Figure 23:
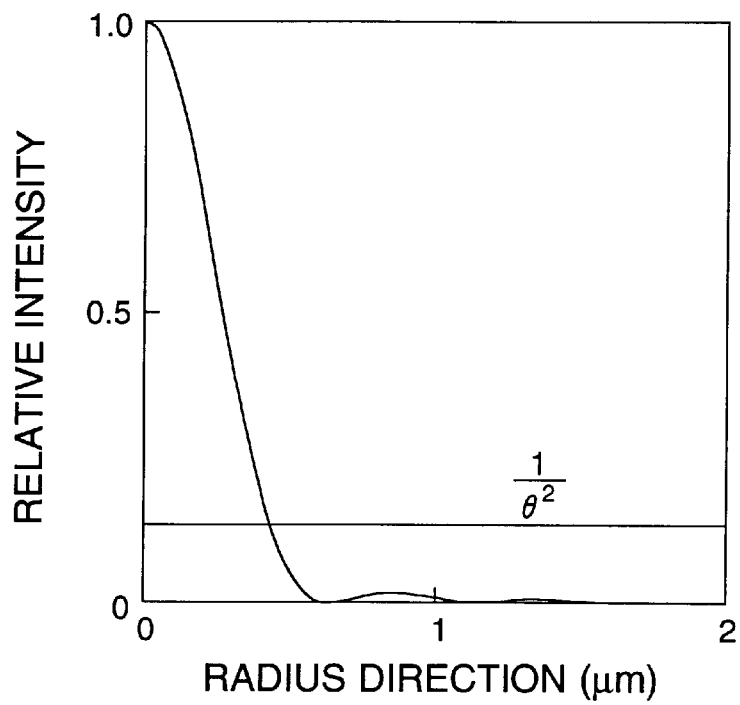
Figure 23:
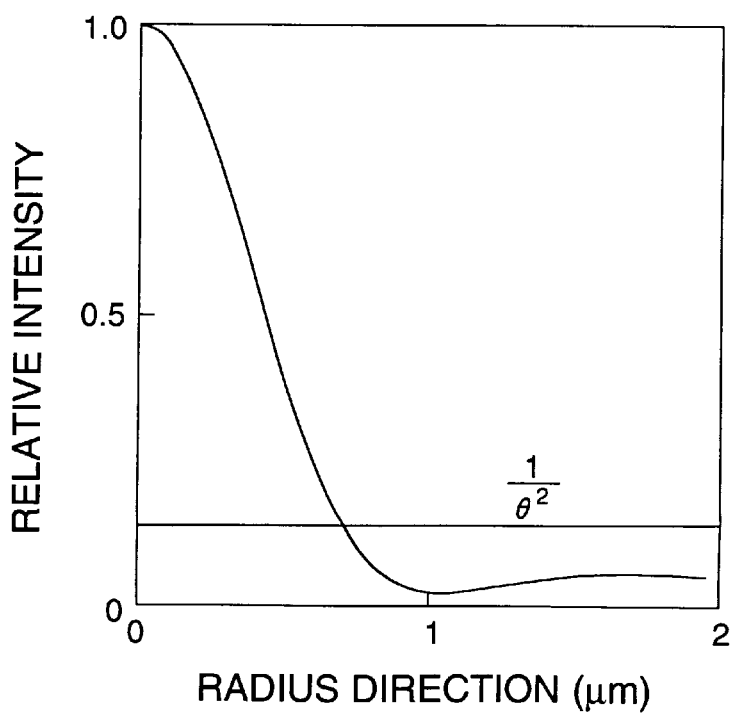

Each of FIGS. 23(a) and 23(b) is a relative intensity distribution diagram of a converged spot which is of the best spot form in the seventh example.

DETAILED DESCRIPTION OF THE INVENTION

First, before explaining an embodiment, an optical information recording medium (hereinafter referred to as an optical disk) will be explained with reference to FIG. 1. Optical pickup apparatus 10 is one wherein information can be recorded on information recording surfaces 22 and 22' respectively of plural optical disks 20 and 20' having respectively transparent base boards 21 and 21' each having a different thickness representing optical information recording media (hereinafter referred to as an optical disk), or information on the information recording surfaces 22 and 22' can be reproduced (also called recording or reading of information on optical disks 20 and 20', or recording/reading of optical disks 20 and 20'). As these plural optical disks 20 and 20', an explanation will be given for the first optical disk 20 having t1-thick transparent base board 21 and the second optical disk 20' having a thickness of t2 which is different from thickness t1 of the transparent base board 21 of the first optical disk. Further, let it be assumed that NA1 represents the necessary numerical aperture on the optical disk side of the converging optical system (which will be stated later) which is necessary for recording/reading of the first optical disk 20, and NA2 represents the necessary numerical aperture on the optical disk side of the converging optical system which is necessary for recording/reading of the second optical disk 20' (in the following explanation, NA1>NA2 because the first optical disk 20 represents an information recording medium which is higher in terms of density than that represented by the second optical disk 20').

Incidentally, in the following explanation, DVD (including DVD-RAM) means the first optical disk 20, in which the transparent base board thickness t1 is 0.6 mm (DVD comes in two types, one is a one-sided type and the other is a two-sided type, and in both types, the information surface is sandwiched by t1-thick transparent base boards, and a thickness of DVD itself is 1.2 mm), while CD (including CD-R, and LD, MD and MO may also be included) means the second optical disk 20' in which t2 is 1.2 mm (provided that t2 is 1.25 mm in the case of LD) and t1 is smaller than t2.

First, an outline of optical pickup apparatus 10 will be explained. FIG. 1 is a schematic structure diagram of optical pickup apparatus 10. In FIG. 1, DVD is shown above an optical axis which is a boundary as the first optical disk 20, and CD CD is shown below the boundary as the second optical disk 20'. In the optical pickup apparatus 10, the optical disks 20 and 20' are placed on a tray (not shown) so that the transparent base board 21 is located between objective lens 16 (which will be explained in detail later) and information recording surfaces 22 and 22'.

In the optical pickup apparatus 10 in the present embodiment, first semiconductor laser 11 (wavelength $\lambda$ 1=635 nm) representing the first light source and second semiconductor laser 12 (wavelength $\lambda 2$=780 nm) representing the second light source are provided as a light source. As the first semiconductor laser 11, those having an oscillation wavelength ranging from 610 nm to 670 nm can be used, and as the second semiconductor laser 12, those having an oscillation wavelength ranging from 740 nm to 870 nm can be used. The first semiconductor laser 11 is a light source used for recording/reading of the first optical disk 20, and the second semiconductor laser 12 is a light source used for recording/reading of the second optical disk 20'. Incidentally, an arrangement of the first semiconductor laser 11 and the second semiconductor laser 12 will be explained in detail later. In FIG. 1, outermost light converged by aperture 17 (stated later) among light flux emitted from the first semiconductor laser 11 is indicated with two-dot chain lines, and outermost light converged by aperture 17 among light flux emitted from the first semiconductor laser 11 is indicated with two-dot chain lines.

Dichroic prism 19 serving as a composing means is a means capable of composing a light flux emitted from the first semiconductor laser 11 and a light flux emitted from the second semiconductor laser 12. This dichroic prism 19 is a means which makes an optical path on an optical axis to be the same (or mostly the same) for the purpose of converging a light flux emitted from the first semiconductor laser 11 or a light flux emitted from the second semiconductor laser 12 on the first optical disk 20 or the second optical disk 20' through one converging optical system stated later. Further, the dichroic prism 19 is a means which leads a light flux emitted from the first semiconductor laser 11 and reflected on the information recording surface of the first optical disk 20 and a light flux emitted from the second semiconductor laser 12 and reflected on the information recording surface of the second optical disk 20' respectively to the first optical detection means 31 and the second optical detection means 32. In the present embodiment, it does not happen that a light flux emitted from the first semiconductor laser 11 and a light flux emitted from the second semiconductor laser 12 are actually composed, because recording/reading for the first optical disk 20 and that for the second optical disk 20' are conducted on an exclusive basis.

A converging optical system is a means which converges a light flux emitted from a light source (the first semiconductor laser 11 or the second semiconductor laser 12) respectively on information recording surfaces 22 and 22' respectively through transparent base boards 21 and 21' of optical disks 20 and 20' to form a spot. This converging optical system has therein coupling lens 13 representing a divergence changing optical element which changes an angle of divergence for light fluxes emitted from the first semiconductor laser 11 and the second semiconductor laser 12 and objective lens 16 representing an objective optical element which converges a light flux whose angle of divergence was changed by the coupling lens 13 on information recording surface 22 of optical disk 20. To be concrete, a collimator lens which converts a light flux emitted from the first semiconductor laser 11 into collimated light (or light mostly collimated) is used as coupling lens 13 in the present embodiment.

In the present embodiment, one converging optical system is used for recording/reading of plural optical disks as stated above. It is therefore possible to realize optical pickup apparatus 10 at low cost and with a simple structure.

Incidentally, for a light flux emitted from the first semiconductor laser 11, coupling lens 13 (collimator lens) and objective lens 16 are used as a converging optical system in the present embodiment, which is the so-called indefinite converging optical system, but it is also possible to employ the so-called finite converging optical system in which no coupling lens 13 is provided and only objective lens 16 is provided for direct converging of divergent light from a light source. Further, it is also possible to use the so-called quasi finite converging optical system wherein a light flux emitted from the first semiconductor laser 11 is not converted in terms of divergence into collimated light by coupling lens 13, but a coupling lens which reduces divergence of divergent light emitted from the first semiconductor laser 11 or a coupling lens which changes a light flux emitted from the first semiconductor laser 11 to convergent light and an objective lens which converges a light flux which has passed through the coupling lens are provided.

In the converging optical system, there is provided aperture 17 which restricts a light flux to a numerical aperture corresponding to numerical aperture NA1. In the present embodiment, the numerical aperture of aperture 17 is fixed so that a light flux emitted from the first semiconductor laser 11 is restricted to the numerical aperture corresponding to numerical aperture NA1. Namely, even for recording/reading for the second optical disk 20', the numerical aperture to be restricted by aperture 17 is the numerical aperture corresponding to NA1, and therefore, an excessive mechanism to make the numerical aperture of aperture 17 to be variable is not needed, which realizes low cost. However, for recording/reading of the second optical disk 20', the numerical aperture of aperture 17 can also be made to be variable so that a light flux emitted from the second semiconductor laser 12 may be restricted to the numerical aperture corresponding to numerical aperture NA2.

Each of beam splitters 25 and 26 serving as a changing means represent a means which changes an optical path of a light flux reflected on the information recording surface to an optical path which is different from that of a light flux emitted from the light source (the first semiconductor laser 11 and the second semiconductor laser 12 respectively). Namely, each of the beam splitters 25 and 26 is a means which makes an optical path of a light flux emitted from the light source (the first semiconductor laser 11, the second semiconductor laser 12) to be the same as an optical path of a light flux reflected on the information recording surface of an optical disk, between the beam splitters 25 and 26 and the optical disk. The beam splitter 25 does not change an optical path of a light flux emitted from the first semiconductor laser 11, but changes an optical path of a light flux reflected on the information recording surface 22 of the first optical disk 20 to lead to optical detection means 31 which will be described later. While the beam splitter 26 which is composed of a parallel plate (half mirror) changes an optical path of a light flux emitted from the second semiconductor laser 12 to lead to the second optical disk 20', and it leads an optical path of a light flux reflected on the information recording surface 22' of the second optical disk 20', without changing it, to optical detection means 32 stated later. Incidentally, with regard to the beam splitters 25 and 26, either one or both of optical paths to be changed may be changed, without arranging them as in the present embodiment.

Each of the optical detection means 31 and 32 is a means to detect a light flux reflected on each of information recording surfaces 22 and 22' of each of optical disks 20 and 2' through each of the beam splitters 25 and 26. By these optical detection means 31 and 32, changes in distribution of an amount of light of a light flux reflected on information recording surfaces 22 and 22' are detected and thereby, focus error signals, tracking error signals and reading signals (information) are read by an unillustrated operation circuit.

In the present embodiment, an astigmatism generating element (in the present embodiment, astigmatism generating element 27 is structured with a cylindrical lens, and beam splitter 26 serves also as an astigmatism generating element) is arranged to be ahead of optical detection means 31 and 32 because focus error signals are detected by an astigmatism method. However, the focus error signals can be detected by various known methods such as a knife edge method (including a Foucault method), a phase difference detecting (DPD) method, and a spot size detection (SSD) method. The tracking error signals can also be detected by various known methods such as a 3-beam method, a phase difference detecting (DPD) method, a push-pull method and a wobbling method.

Two-dimensional actuator 15 is a means to move objective lens 16, and the two-dimensional actuator for focusing control moves objective lens 16 to the prescribed position (focusing tracking) based on focus error signals obtained by the operation circuit, while the two-dimensional actuator for tracking control moves objective lens 16 to the prescribed position (track tracking) based on track error signals.

Next, an outline of recording/reading of the first optical disk 20 in the aforesaid optical pickup apparatus 10 will be explained.

A light flux (shown with two-dot chain lines in FIG. 1) emitted from the first semiconductor laser 11 is transmitted through beam splitter 25, then deflected in terms of its optical path by dichroic prism 19 toward a converging optical system, and enters the converging optical system. The light flux emitted from the first semiconductor laser 11 and has entered the converging optical system is changed in terms of its divergence by coupling lens 13, namely, changed to a collimated light flux in the present embodiment. The light flux changed in terms of its divergence by the coupling lens 13 to be collimated is narrowed by aperture 17 to be converged on the information recording surface 22 by objective lens 16 through transparent base board 21 of the first optical disk 20. When recording on the first optical disk 20, the recording is conducted by this converged beam spot.

A light flux reflected on the information recording surface 22 is transmitted again through converging optical systems (objective lens 16, coupling lens 13), then is changed in terms of its optical path by dichroic prism 19 and beam splitter 25, and is given astigmatism by cylindrical lens 27 and enters optical detection means 31. When reproducing the first optical disk 20, signals outputted from the optical detection means 31 are used to obtain reading signals of information recorded on the first optical disk 20. Further, changes of distribution of an amount of light caused by the change in a spot form on the optical detection means 31 are detected, and focus error signals and tracking error signals are obtained. Objective lens 16 is moved by two-dimensional actuator (for focusing control) 15 based on the focus error signals thus obtained so that images are formed on the information recording surface 22 of the first optical disk 20 by a light flux emitted from the first semiconductor laser 11. Further, objective lens 16 is moved by two-dimensional actuator (for tracking control) 15 based on the tracking error signals thus obtained so that images are formed on the prescribed track of the first optical disk 20 by a light flux emitted from the first semiconductor laser 11.

Thus, information is recorded on the information recording surface 22 of the first optical disk 20 or information on the information recording surface 22 of the first optical disk 20 is reproduced.

In the same way, in the case of recording/reading of the second optical disk 20', a light flux (shown with one-dot chain lines in FIG. 1) emitted from the second semiconductor laser 12 is deflected in terms of its optical path by parallel plate 26, then is transmitted through dichroic prism 19, coupling lens 13, (narrowed by aperture 17), objective lens 16, and is converged on the information recording surface 22' through transparent base board 21' of the second optical disk 20'. Then, the light flux reflected on the information recording surface 22' is transmitted atain through converging optical systems (objective lens 16, coupling lens 13), and dichroic prism 19, then is given astigmatism by parallel plate 26, and enters optical detection means 32. Then, signals outputted from optical detection means 32 are used for obtaining reading signals, focus error signals and tracking error signals. Objective lens 16 is moved by two-dimensional actuator (for focusing control) 15 based on the focus error signals thus obtained so that images are formed on the information recording surface 22' of the second optical disk 20' by a light flux emitted from the second semiconductor laser 12. Further, objective lens 16 is moved by two-dimensional actuator (for tracking control) 15 based on the tracking error signals thus obtained so that images are formed on the prescribed track of the second optical disk by a light flux emitted from the second semiconductor laser 12.

Thus, information is recorded on the information recording surface 22' of the second optical disk 20' or information on the information recording surface 22' of the second optical disk 20' is reproduced. Incidentally, in the drawing, the distance (so-called working distance) between refraction surface S2 of objective lens 16 on the optical disk side and the optical disk surface is the same both for the first optical disk 20 and the second optical disk 20'. However, as is apparent from the example stated later, the working distance for the first optical disk 20 is different from that for the second optical disk 20', and this is moved by the two-dimensional actuator (for focusing control) 15. Therefore, the two-dimensional actuator (for focusing control) 15 having the working distance capable of conducting focusing for both optical disks is used.

Next, a converging optical system will be explained. The converging optical system is structured in a way that a light flux emitted from each of light sources 11 and 12 is split into at least two areas in the direction perpendicular to an optical axis (this will be explained in detail with reference to the concrete example in the latter part). Therefore, the converging optical system is provided with a lens surface splitting section which is mostly coaxial with an optical axis and makes wave front aberration to be discontinuous (not only separation but also refraction). By providing wave front aberration to be discontinuous, an aperture restriction effect (aperture effect) is obtained, and it is not necessary to change the numerical aperture restricted by aperture 17 between recording/reading of the first optical disk 20 and that of the second optical disk 20', which realizes low cost.

Now, let it be assumed that when one lens surface splitting section is provided (two-area converging optical system), the first area is an area closer to an optical axis than the lens surface splitting section and the third area is an area outside the lens surface splitting section, and the numerical aperture of the converging optical system on the optical disk side corresponding to the lens surface splitting section is represented by NA3. Let it be assumed further that when two lens surface splitting sections are provided, the first area is an area closer to an optical axis than an inner lens surface splitting section, the second area is an area between two lens surface splitting sections, and the third area is an area outside an outer lens surface splitting section, while the numerical aperture of the converging optical system on the optical disk side corresponding to the inner lens surface splitting section among the two lens surface splitting sections is represented by NA3 and the numerical aperture of the converging optical system on the optical disk side corresponding to the outer lens surface splitting section is represented by NA4. Incidentally, when two lens surface splitting sections are provided, the second area can also be of shielding structure (the structure wherein light from a light source is shaded through absorption, dispersion or reflection, and a light flux corresponding to this second area does not reach the optical detection means 32) (this is shielding converging optical system, and the case which is not of a shielding structure is a 3-area converging optical system).

In a converging optical system such as this, light fluxes passing through the first area and the third area are used for recording/reading of the first optical disk 20, while a light flux passing through the first area (also a light flux passing through the second area in the case of 3-area converging optical system) is used for recording/reading of the second optical disk 20'. Therefore, a light flux for the first area closer to an optical axis than the lens surface splitting section is used not only for recording/reading of the first optical disk 20 but also for recording/reading of the second optical disk 20'.

However, these 2-area converging optical system and shielding converging optical system which make wave front aberration (spherical aberration) to be discontinuous can not cope with the second optical disk which requires high NA. The reason for the foregoing is that, when an image is formed on the information recording surface 22' of the second optical disk 20' with magnification m1 of objective lens 16 viewed from the first optical disk side in recording/reading of the first optical disk 20, there is heavily caused spherical aberration by a difference between transparent base board thickness t1 and t2. Accordingly, the upper limit of a light flux for the first area used for recording/reading of the second optical disk 20', namely, the numerical aperture NA3 is required to be small. Therefore, when the two-area converging optical system and the shielding converging optical system are used, they can not cope with the second optical disk requiring high NA. Even in the case of 3-area converging optical system, when it is used for the second optical disk requiring high NA, an amount of light in recording/reading for the first optical disk is lowered sharply.

With a background mentioned above, magnification m2 of objective lens 16 viewed from the second optical disk 20' side in recording/reading of the second optical disk 20' is made to be smaller than magnification m1 (m1=0 because of the indefinite system in the present embodiment) of objective lens 16 viewed from the first optical disk 20 side in recording/reading of the first optical disk 20 in the present embodiment. Namely, divergence of a light flux entering objective lens 16 for recording/reading of the first optical disk 20 is changed for recording/reading of the second optical disk 20' and thereby spherical aberration component of wave front aberration that is important for converging characteristics is changed to cope with high NA. To be more precise, the magnification m2 is set in the direction to correct (over) spherical aberration caused by a difference between thickness t1 of transparent base board 21 of the first optical disk 20 and thickness t2 of transparent base board 21' of the second optical disk 20' (spherical aberration caused when the magnification m1 is used for transparent base board 21' having thickness of t2), (in other words, the magnification m2 is set in the direction to generate negative spherical aberration).

Due to the foregoing, spherical aberration caused in the course of recording/reading of the second optical disk 20' is corrected, and thereby the upper limit of the first light flux to be converged, namely the numerical aperture NA3 can be made large in recording/reading of the second optical disk 20', making it possible to cope with high NA.

To be concrete, in the present embodiment, the position of coupling lens 13 for recording/reading of the first optical disk 20 is not changed for recording/reading of the second optical disk 20', and the second semiconductor laser 12 is arranged in a way that the position of the second semiconductor laser 12 is allowed to come near coupling lens 13. In this way, the second semiconductor laser 12 is arranged to be closer to the coupling lens 13 than the first semiconductor laser 11 in the present embodiment, therefore it is possible to make the magnification m2 to be smaller than the magnification m1 to cope with high NA.

In the present embodiment, it is possible to arrange the first and second semiconductor lasers 11 and 12 to be fixed by making the positions of the first and second semiconductor lasers 11 and 12 to be different from each other, which requires no moving means, However, the position of coupling lens 13 for recording/reading of the first optical disk 20 and that for recording/reading of the second optical disk 20' may be made different each other (in this case, the position for recording/reading of the second optical disk is made to be closer to a light source), and in short, the distance between the second semiconductor laser 12 and coupling lens 13 in the optical axis direction is made to be shorter than that between the first semiconductor laser 11 and coupling lens 13 in the optical axis direction.

In this case, it is preferable that m2−m1 which is a difference between magnification m1 and magnification m2 satisfies the relation of −0.05<m2−m1<−0.005, and it is more preferable that the relation of −0.04<m2−m1<−0.01 is satisfied.

When this lower limit is exceeded, namely when a difference between m1 and m2 is greater, sine conditions are sharply changed, off-axis characteristics are deteriorated, and high accuracy is required for assembly of an optical pickup apparatus. When the upper limit is exceeded, namely when a difference between m1 and m2 is smaller, it is difficult to cope with high NA.

In the converging optical system structured as stated above, it is possible to conduct recording/reading of the first optical disk 20 properly by making the wave front aberration of a beam spot formed on the information recording surface 22 by a light flux passing through the first and the third areas to be 0.05 $\lambda$ 1 (rms) or less in recording/reading of the first optical disk 20. Further, for recording/reading of the second optical disk 20', it is possible to conduct recording/reading of the second optical disk 20' properly by making the wave front aberration of a beam spot formed on the information recording surface 22' by a light flux passing through the first area to be 0.07 $\lambda$ 2 (rms) or less.

Further, since the wave front aberration is made to be discontinuous at the lens surface splitting section to obtain an effect of restricting the numerical aperture in the present embodiment, spherical aberration is not corrected completely so that it may remain when setting magnification m2 so that the aforesaid effect may be kept. It is therefore preferable that the wave front aberration of a beam spot formed on the information recording surface 22' by a light flux passing through the first area is made to be 0.025 $\lambda$ 2 (rms) or more.

Next, concrete examples of the converging optical system will be explained for a 3-area converging optical system, a shielding converging optical system and a 2-area converging optical system. Incidentally, the converging optical system is composed of coupling lens 13 and objective lens 16, and the coupling lens 13 serves as a collimator lens for recording/reading of the first optical disk 20, to which the invention is not limited, and a lens surface splitting section is provided on refraction surface S1 which is closer to a light source among two refraction surfaces S1 and S2 of the objective lens 16, to which the invention is not limited, and the lens surface splitting section can also be provided on refraction surface S2, or even on the coupling lens 13 or on a separate optical element. Though the second split surface Sd2 is provided to be of a ring (circle)-shape coaxial with an optical axis in the present example, the invention is not limited to this, and a coaxial elliptical shape or a split ring shape may also be provided.

In all converging optical systems mentioned above, the first area can be split into plural portions. Further, in the shielding converging optical system and the 3-area converging optical system, the second area can be split into plural portions to provide and to use a part of them for recording/reading of the first optical disk, for the purpose of further improvement of an amount of light for recording/reading of the first optical disk.

(Three-Area Converging Optical System)

An explanation will be given based on FIG. 2 showing an illustrative diagram and a spherical aberration diagram for recording/reading of an optical disk conducted by a three-area converging optical system. FIG. 2(*a*) represents a diagram showing illustratively how an image is formed on the first optical disk 20 by a light flux passing through objective lens 16 in recording/reading of the first optical disk 20, and FIG. 2(b) is a diagram of spherical aberration on the information recording surface 22 of the first optical disk 20. FIG. 2(c) represents a diagram showing illustratively how an image is formed on the second optical disk 20' by a light flux passing through objective lens 16 in recording/reading of the second optical disk 20', and FIG. 2(d) is a diagram of spherical aberration on the information recording surface 22' of the second optical disk 20'. Incidentally, the spherical aberration shown with dotted lines in FIG. 2(d) shows spherical aberration on the occasion wherein an image is formed on the information recording surface 22' of the second optical disk 20' with magnification m1 for recording/reading of the first optical disk 20.

In the present example, objective lens 16 is a convex lens which has aspherical refraction surface S1 on the light source side and aspherical refraction surface S2 (last refraction surface) on the optical disk side and has positive refraction power. The refraction surface S1 of the objective lens 16 is composed of three split surfaces of first split surface Sd1—third split surface Sd3 (corresponding to the aforesaid first area—third area) which are mostly coaxial with an optical axis, and boundaries of the split surfaces Sd1–Sd3 are provided with steps. These steps are lens surface split sections, and are provided at positions corresponding to numerical apertures NA3 and Na4, and wave front aberration is discontinuous at these steps.

Figure 2A:
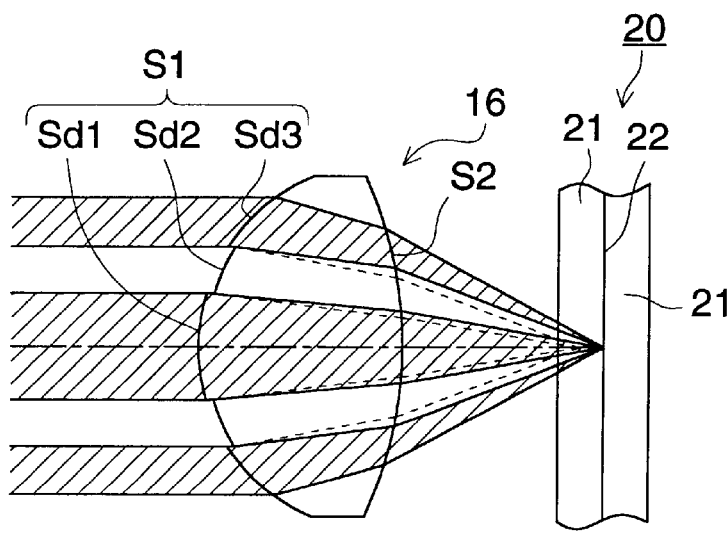
FIGS. 2(a)–2(d) represent an illustrative diagram and a spherical aberration diagram both for recording/reading of an optical disk conducted by a 3-area converging optical system.
Figure 2B:
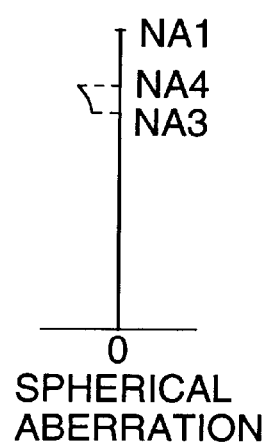

As shown in FIGS. 2(a) and 2(b), with regard to the objective lens 16, in the case of recording/reading of the first optical disk 20, a collimated light flux enters the objective lens 16 because of magnification m1=1. The first light flux and the third light flux passing respectively through the first split surface Sd1 and the third split surface Sd3 form images on the information recording surface 22 of the first optical disk. In this case, wave front aberration of beam spots formed on the recording surface 22 respectively by the first light flux and the third light flux is 0.05 λ 1 (rms) or less. On the other hand, an image formed by the second light flux (shown with dotted lines) passing through the second split surface Sd2 is on the under side from the information recording surface 22 of the first optical disk 20. In the case of recording/reading of the first optical disk, therefore, the first light flux and the third light flux are converged on the information recording surface 22 of the first optical disk, and recording/reading of the first optical disk 20 is thus conducted.

Figure 2C:
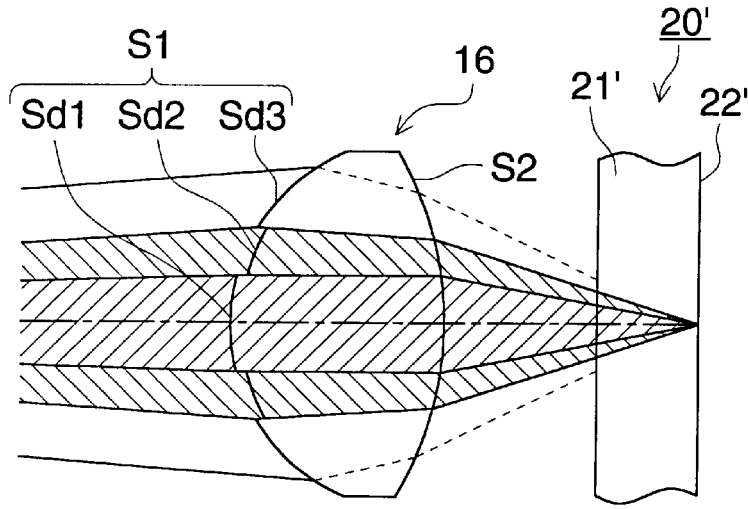
Figure 2D:
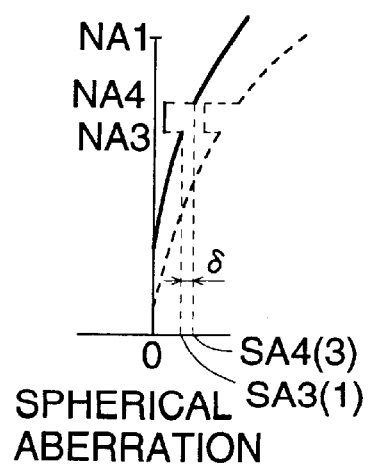

When the objective lens 16 forms images on the information recording surface 22' of the second optical disk with magnification m1 which is for recording/reading of the first optical disk 20, spherical aberration is generated to a great extent by a transparent base board thickness difference between t1 and t2 as shown with dotted lines in FIG. 2(d). In the present embodiment, the spherical aberration generated to a great extent can be corrected to one shown with solid lines in FIG. 2(d) by making magnification m2 for recording/reading of the second optical disk 20' to be smaller than m1.

Therefore, in the case of recording/reading of the second optical disk 20' (see FIGS. 2(c) and 2(d)), a divergent light flux enters the objective lens 16 because of m2<m1, and the first light flux (shown with hatched lines inclined upward from left to right) and the second light flux (shown with hatched lines inclined downward from left to right) form images on the information recording surface 22' of the second optical disk 20'. In this case, wave front aberration of a beam spot formed on the information recording surface 22' by the first light flux is 0.07 λ 2 (rms) or less. On the other hand, flare is generated by the third light flux (shown part way with dotted lines). Accordingly, a beam spot formed on the information recording surface 22' of the second optical disk 20' has a core formed mainly by the first and second light fluxes and has a flare which surrounds the core and is formed by the third light flux, and this core conducts recording/reading of the second optical disk 20'.

Since it is possible, in the 3-area objective lens 16, to use a portion between numerical aperture NA3 and numerical aperture NA4 (namely, the second split surface) for recording/reading of the second optical disk 20' as stated above, optimization of wave front aberration on the aforesaid portion makes it possible to achieve high NA while maintaining the wave front aberration of the first light flux to be small in recording/reading of the second optical disk 20'.

In the case of 3-area objective lens 16, it is preferable to satisfy the relation of 0.7NA2<NA3<1.05NA2. When this lower limit is exceeded, a lack of an amount of light which depends on numerical aperture NA2 is caused in recording/reading of the first optical disk. When the lower limit is exceeded, a spot diameter is reduced to be narrower than is necessary, and a difference between magnification m1 and magnification m2 becomes greater, resulting in remarkable changes of sine conditions, which deteriorates off-axis characteristics and requires accuracy in assembly of optical pickup apparatus 10.

It is further preferable that the following relation is satisfied.

$$0.04<(NA4^2-NA3^2)/NA1^2<0.4$$

When this lower limit is exceeded, an effect of the second light flux for high NA is made small in recording/reading of the second optical disk 20'. Namely, despite the 3-area converging optical system which can cope with higher NA originally compared with other converging optical systems (2-area converging optical system and shielding converging optical system which will be described in detail in the latter part), when this lower limit is exceeded, rounding off is caused by molding (molding by metal mold) of a step portion, resulting in no difference from 2-area objective lens 16 (converging optical system) which will be explained in the latter part. When the upper limit is exceeded, a lack of an amount of light is caused in recording/reading of the first optical disk.

Further, in the 3-area objective lens 16, when δ represents a difference between spherical aberration amount SA3 (1) generated in light passing through the first split surface Sd1 at the position of numerical aperture NA3 and spherical aberration amount SA4 (3) generated in light passing through the third split surface Sd3 at the position of numerical aperture NA4, in recording/reading of the second optical disk 20' (see FIG. 2(d)), it is preferable to satisfy the relation of 0.002 mm<δ<0.020 mm. When this lower limit is exceeded, there happen problems that a side-lobe of a spot is increased in recording/reading of the second optical disk 20' and asymmetry is caused in focus error signals. When the upper limit is exceeded, it is not possible to balance between recording/reading of the first optical disk 20 and that of the second optical disk 20', which makes it impossible to conduct them properly. Incidentally, even when the lower limit is exceeded, the asymmetry of focus error signals can be improved if an aperture moving together with objective lens 16 is restricted for tracking error in recording/reading of the second optical disk 20'. Therefore, this lower limit does not need to exist.

Incidentally, since the difference δ corresponds to the distance between a core and flare of a spot generated in the course of recording/reading of the second optical disk 20', it is measured with a micrometer by paying attention to boundary portions of areas (light fluxes) and by changing defocus while observing interference fringes.

In the present example, each of boundaries of the first split surface Sd1—the third split surface Sd3 is provided with a step. However, it is also possible to arrange so that a step is provided on a boundary on one side only, or split surfaces are connected by the surface with a prescribed radius of curvature. In a word, it is satisfactory that wave front aberration is made to be discontinuous (separation (skipping) is preferable though flexion is also accepted) on a lens surface split section.

Though the second split surface Sd2 of objective lens 16 is aspherical in the present example, it is also possible to structure using a hologram (or Fresnel fringe). When the second split surface Sd2 is structured with a hologram, one of the light flux which is split into 0-order light and first-order light is used for recording/reading of the first optical disk, and the other is used for recording/reading of the second optical disk. In this case, it is preferable that an amount of light of the light flux used for recording/reading of the second optical disk is greater than that of the light flux used for recording/reading of the first optical disk.

Though the second split surface Sd2 is structured to be given spherical aberration in the present example, it is also possible, in place of the foregoing, to arrange so that a phase difference is provided, namely, a phase of the light flux passing through the second split surface Sd2 is deviated from that of the light flux passing through the first and third split surfaces Sd1 and Sd3.

Though the first split surface Sd1 and the third split surface Sd3 are structured to be of the same aspherical form, it is also possible to arrange to control the peak intensity of a spot in recording/reading of the first optical disk 20 by providing a phase difference between the first split surface Sd1 and the third split surface Sd3.

(Shielding Converging Optical System)

An explanation will be given as follows with reference to FIG. 3 representing an illustrative diagram and a spherical aberration diagram both for recording/reading of an optical disk conducted by a shielding converging optical system. FIG. 3(a) is a diagram showing illustratively how a light flux passing through objective lens 16 forms an image on the first optical disk 20 in the course of recording/reading of the first optical disk 20, while FIG. 3(b) is a diagram of spherical aberration on the information recording surface 22 of the first optical disk 20. FIG. 3(c) is a diagram showing illustratively how a light flux passing through objective lens 16 forms an image on the second optical disk 20' in the course of recording/reading of the second optical disk 20', while FIG. 3(d) is a diagram of spherical aberration on the information recording surface 22' of the second optical disk 20'. Spherical aberration shown with dotted lines in FIG. 3(d) is one generated when an image is formed on the information recording surface 22' of the second optical disk 20' at magnification m1 for recording/reading of the first optical disk 20.

In the present example, objective lens 16 is a convex lens which has aspherical refraction surface S1 on the light source side and aspherical refraction surface S2 (last refraction surface) on the optical disk side and has positive refraction power. Shielding structure SH is provided on the refraction surface S1 of the objective lens 16 by evaporating substances which absorb light from a light, on the almost coaxial with an optical axis basis. Due to this shielding structure SH provided, the refraction surface S1 of the objective lens 16 is composed of three split surfaces including the first and third split surfaces Sd1 and Sd3 both transmitting light from a light source and the second split surface Sd2 which intercepts light from a light source (corresponding respectively to the first area, third area and second area). Boundaries of split surfaces Sd1–Sd3 are lens surface split sections provided at positions corresponding to numerical apertures NA3 and NA4, and wave front aberration between the numerical aperture NA3 and numerical aperture NA4 is discontinuous.

Figure 3A:
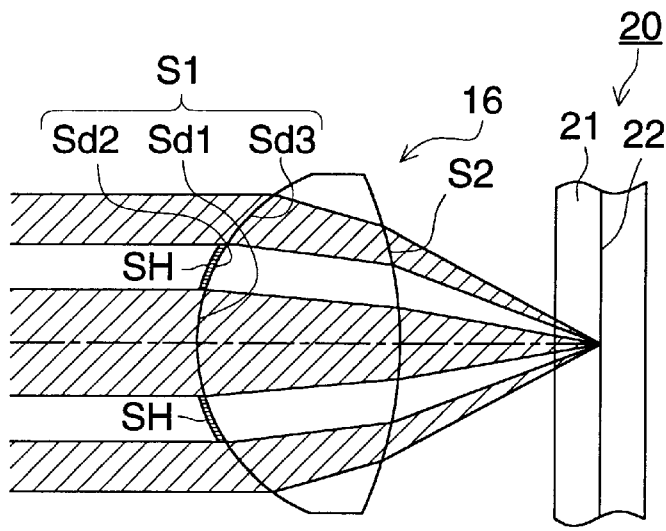
FIGS. 3(a)–3(d) represent an illustrative diagram and a spherical aberration diagram both for recording/reading of an optical disk conducted by a shielding converging optical system.
Figure 3B:
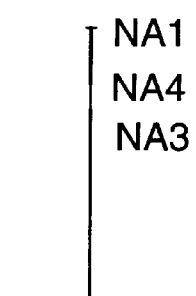

As FIGS. 3(a) and 3(b) show, in the case of recording/reading of the first optical disk 20, collimated light fluxes enter objective lens 16 because magnification m1 for the objective lens 16 is zero. The first light flux and the third light flux passing respectively through the first split surface Sd1 and the third split surface Sd3 form images on the information recording surface 22 of the first optical disk. In this case, wave front aberration of each of beam spots formed on the information recording surface 22 respectively by the first and third light fluxes is 0.05 $\lambda$ 1 (rms) or less. On the other hand, a light flux which arrives at the second split surface Sd2, namely the second light flux is absorbed by shielding structure SH and thereby is not transmitted therethrough. For recording/reading of the first optical disk, therefore, the first light flux and the third light flux are converged on the information recording surface 22 of the first optical disk, thus, recording/reading of the first optical disk 20 is conducted.

When this objective lens 16 is used at magnification m1 which is for recording/reading of the first optical disk 20 for image formation on the information recording surface 22' of the second optical disk 20', spherical aberration is caused remarkably by the transparent base board thickness difference t1 and t2. In the present embodiment, the spherical aberration caused remarkably is corrected to one shown with solid lines in FIG. 3(d) by making magnification m2 for recording/reading of the second optical disk 20' to be smaller than m1.

In the present invention, the magnification of the objective lens is defined as zero when a collimated light flux is incident on the objective lens, the magnification is defined with a positive value when a converged light flux is incident on the objective lens, and the magnification is defined with a negative value when a divergent light flux is incident on the objective lens.

Figure 3C:
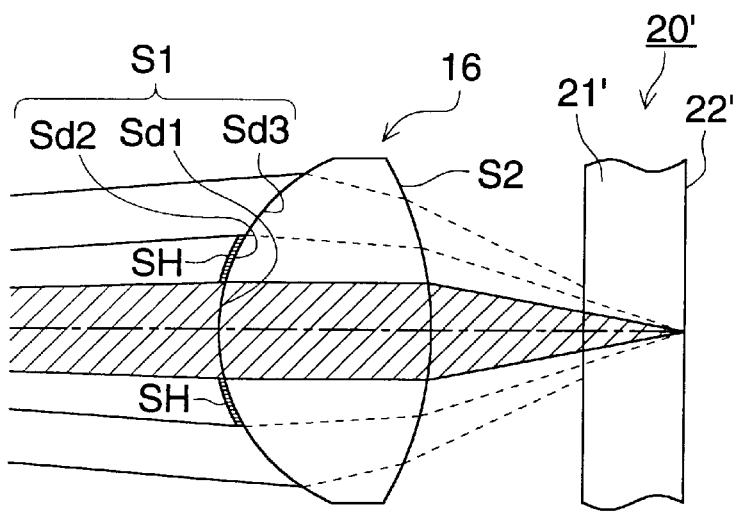
Figure 3D:
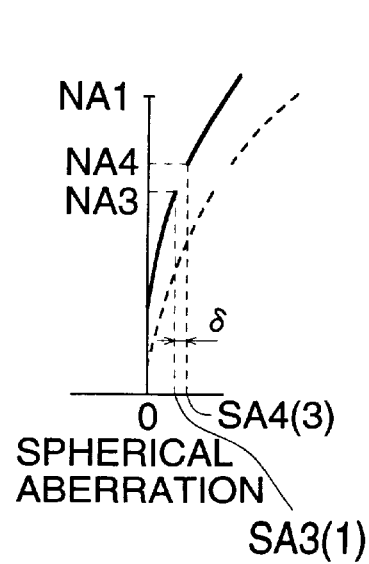

Accordingly, a divergent light flux enters objective lens 16 in the case of recording/reading of the second optical disk 20' (see FIGS. 3(c) and 3(d)) because of magnification m2<magnification m1. The first light flux (shown with hatched lines) mostly forms an image on the information recording surface 22' of the second optical disk 20'. In this case, wave front aberration of a beam spot formed on the information recording surface 22' by the first light flux is 0.07 $\lambda$ 2 (rms) or less. On the other hand, flare is generated by the third light flux (shown part way with dotted lines), and a light flux arriving at the second split surface Sd2, namely the second light flux is not transmitted through shielding structure SH but is absorbed thereby. On the information recording surface 22' of the second optical disk 20', therefore, a beam spot formed on the information recording surface 22' of the second optical disk 20' has a core formed by the first light flux and has a flare which surrounds the core and is formed by the third light flux, and this core conducts recording/reading of the second optical disk 20'.

As stated above, the shielding structure SH is provided between numerical aperture NA3 and numerical aperture NA4 (namely, the second split surface Sd2) in the shielding objective lens 16. In the case of recording/reading of the second optical disk 20', therefore, spherical aberration (wave front aberration) of the aforesaid portion (the second area) is skipped to be discontinuous, making it possible to reduce an effect of flare. Further, owing to the relation of m2<m1 arranged on the shielding objective lens 16, it is possible to reduce spherical aberration caused by a transparent base board thickness difference between t1 and t2 in recording/reading of the second optical disk 20' and to achieve high NA.

Incidentally, in the shielding objective lens 16, a boundary located at the position of NA3 serves as an aperture restriction, and it is preferable to satisfy the relation of 0.9 NA2<NA3<1.2 NA2. When this lower limit is exceeded, a spot diameter can not be reduced in recording/reading of the second optical disk 20'. When the upper limit is exceeded, a spot diameter is reduced to be smaller than is necessary, and a difference between magnification m1 and magnification m2 becomes greater, resulting in remarkable changes of sine conditions, which deteriorates off-axis characteristics and requires accuracy in assembly of optical pickup apparatus 10.

Further, in the 3-area objective lens 16, when δ represents a difference between spherical aberration amount SA3 (1) generated in light passing through the first split surface Sd1 at the position of numerical aperture NA3 and spherical aberration amount SA4 (3) generated in light passing through the third split surface Sd3 at the position of numerical aperture NA4, in recording/reading of the second optical disk 20' (see FIG. 3(d)), it is preferable to satisfy the relation of 0.002 mm<δ<0.020 mm. When this lower limit is exceeded, there happen problems that a side-lobe of a spot is increased in recording/reading of the second optical disk 20' and asymmetry is caused in focus error signals. When the upper limit is exceeded, it is not possible to balance between recording/reading of the first optical disk 20 and that of the second optical disk 20', which makes it impossible to conduct them properly. Incidentally, even when the lower limit is exceeded, the asymmetry of focus error signals can be improved if an aperture moving together with objective lens 16 is restricted for tracking error in recording/reading of the second optical disk 20'. Therefore, this lower limit does not need to exist. Since the measurement of δ is the same as the 3-area converging optical system stated above, it is omitted here.

(Two-Area Converging Optical System)

Figure 4:
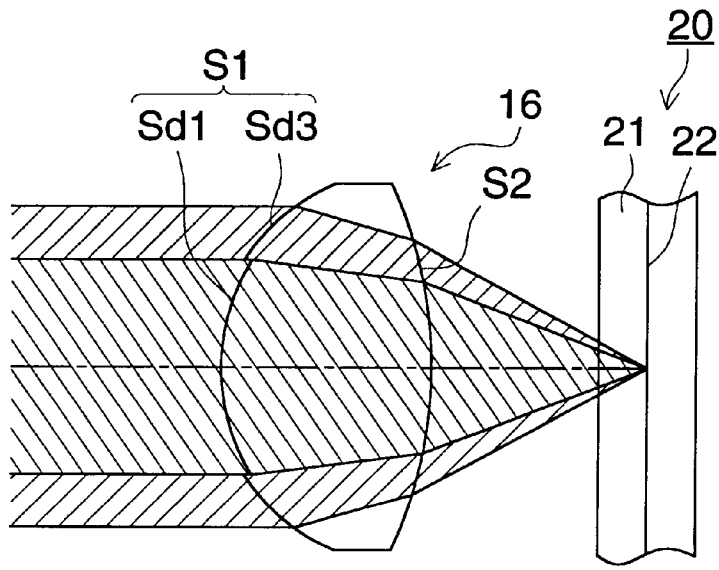
FIGS. 4(a)–4(d) represent an illustrative diagram and a spherical aberration diagram both for recording/reading of an optical disk conducted by a 2-area converging optical system.
Figure 4:
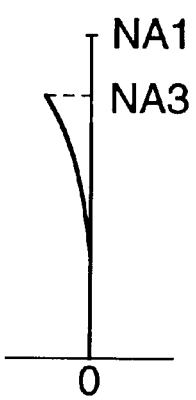
Figure 4:
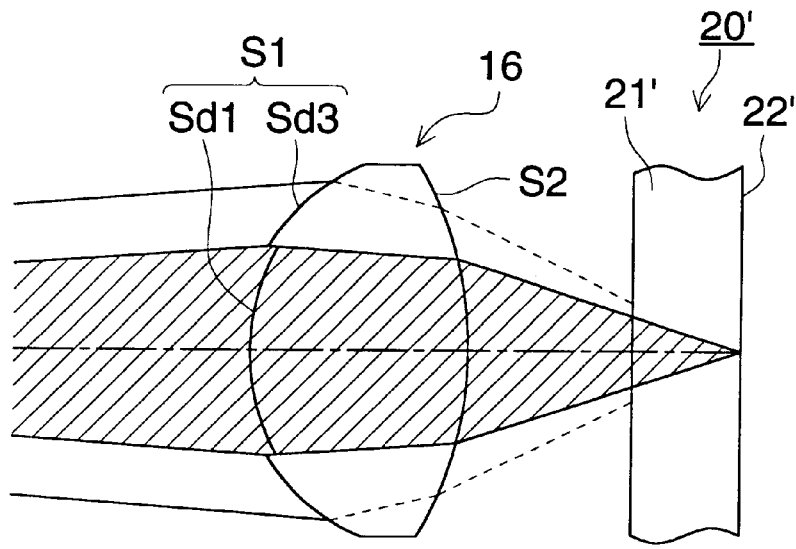
Figure 4:
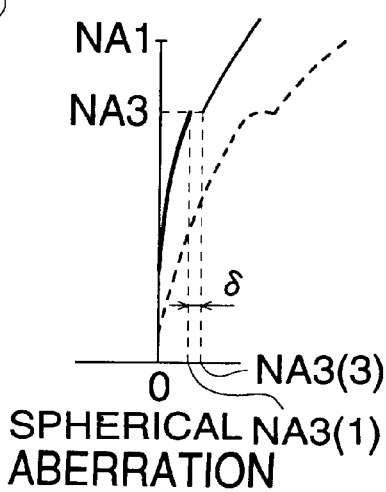

An explanation will be given based on FIG. 4 showing an illustrative diagram and a spherical aberration diagram for recording/reading of an optical disk conducted by a three-area converging optical system. FIG. 4(a) represents a diagram showing illustratively how an image is formed on the first optical disk 20 by a light flux passing through objective lens 16 in recording/reading of the first optical disk 20, and FIG. 4(b) is a diagram of spherical aberration on the information recording surface 22 of the first optical disk 20. FIG. 4(c) represents a diagram showing illustratively how an image is formed on the second optical disk 20' by a light flux passing through objective lens 16 in recording/reading of the second optical disk 20', and FIG. 4(d) is a diagram of spherical aberration on the information recording surface 22' of the second optical disk 20'. Incidentally, the spherical aberration shown with dotted lines in FIG. 4(d) shows spherical aberration on the occasion wherein an image is formed on the information recording surface 22' of the second optical disk 20' with magnification m1 for recording/reading of the first optical disk 20.

In the present example, objective lens 16 is a convex lens which has aspherical refraction surface S1 on the light source side and aspherical refraction surface S2 (last refraction surface) on the optical disk side and has positive refraction power. The refraction surface S1 of the objective lens 16 is composed of two split surfaces of first split surface Sd1 and third split surface Sd3 (corresponding to the aforesaid first area and third area) which are mostly coaxial with an optical axis, and a boundary between the split surfaces Sd1 and Sd3 is provided with a step. This step is a lens surface split section, and is provided at a position corresponding to numerical apertures NA3, and wave front aberration is discontinuous at this portion.

As shown in FIGS. 4(a) and 4(b), with regard to the objective lens 16, in the case of recording/reading of the first optical disk 20, a collimated light flux enters the objective lens 16 because of magnification m1=1. The first light flux and the third light flux passing respectively through the first split surface Sd1 and the third split surface Sd3 mostly form images on the information recording surface 22 of the first optical disk. In this case, wave front aberration of beam spots formed on the recording surface 22 respectively by the first light flux and the third light flux is 0.05 λ 1 (rms) or less. Therefore, the first light flux and the third light flux are converged on the information recording surface 22 of the first optical disk, and recording/reading of the first optical disk 20 is thus conducted.

When the objective lens 16 forms images on the information recording surface 22' of the second optical disk with magnification m1 which is for recording/reading of the first optical disk 20, spherical aberration is generated to a great extent by a transparent base board thickness difference between t1 and t2 as shown with dotted lines in FIG. 4(d). In the present embodiment, the spherical aberration generated to a great extent can be corrected to one shown with solid lines in FIG. 4(d) by making magnification m2 for recording/reading of the second optical disk 20' to be smaller than m1.

Therefore, in the case of recording/reading of the second optical disk 20' (see FIGS. 4(c) and 4(d)), a divergent light flux enters the objective lens 16 because of m2<m1, and the first light flux (shown with hatched lines) forms images on the information recording surface 22' of the second optical disk 20'. In this case, wave front aberration of a beam spot formed on the information recording surface 22' by the first light flux is 0.07 λ 2 (rms) or less. On the other hand, flare is generated by the third light flux (shown part way with dotted lines). Accordingly, a beam spot formed on the information recording surface 22' of the second optical. disk 20' has a core formed by the first light flux and has a flare which surrounds the core and is formed by the third light flux, and this core conducts recording/reading of the second optical disk 20'.

As stated above, a step is provided at the position of numerical aperture NA3 in the 2-area objective lens 16. In the case of recording/reading of the second optical disk 20', therefore, spherical aberration (wave front aberration) of the aforesaid portion of the step is skipped to be discontinuous, making it possible to reduce an effect of flare. Further, owing to the relation of m2<m1 arranged on the 2-area objective lens 16, it is possible to reduce spherical aberration caused by a transparent base board thickness difference between t1 and t2 in recording/reading of the second optical disk 20' and to achieve high NA.

Incidentally, in the 2-area objective lens 16, a step located at the position of NA3 serves as an aperture restriction, and it is preferable to satisfy the relation of 0.9 NA2<NA3<1.2 NA2. When this lower limit is exceeded, a spot diameter can not be reduced in recording/reading of the second optical disk 20'. When the upper limit is exceeded, a spot diameter is reduced to be smaller than is necessary, and a difference between magnification m1 and magnification m2 becomes greater, resulting in remarkable changes of sine conditions, which deteriorates off-axis characteristics and requires accuracy in assembly of optical pickup apparatus 10.

Further, in the 2-area objective lens 16, when δ represents a difference between spherical aberration amount SA3 (1) generated in light passing through the first split surface Sd1 at the position of numerical aperture NA3 and spherical aberration amount SA3 (3) generated in light passing through the third split surface Sd3 at the position of numerical aperture NA4, in recording/reading of the second optical disk 20' (see FIG. 4(d)), it is preferable to satisfy the relation of 0.002 mm<δ<0.010 mm. When this lower limit is exceeded, there happen problems that a side-lobe of a spot is increased in recording/reading of the second optical disk 20' and asymmetry is caused in focus error signals. When the upper limit is exceeded, it is not possible to balance between recording/reading of the first optical disk 20 and that of the second optical disk 20', which makes it impossible to conduct them properly. Incidentally, even when the lower limit is exceeded, the asymmetry of focus error signals can be improved if an aperture moving together with objective lens 16 is restricted for tracking error in recording/reading of the second optical disk 20'. Therefore, this lower limit does not need to exist. Since the measurement of δ is the same as the 3-area converging optical system stated above, it is omitted here.

In the present example, a boundary between the first split surface Sd1 and the third split surface Sd3 is provided with a step. However, it is also possible to arrange so that split surfaces are connected not by the step but by the surface with a prescribed radius of curvature.

Further, in the objective lens 16 in the present example, skipping (δ) of phase can be controlled by a boundary area and it is possible to keep balance between recording/reading of the first optical disk 20 and that of the second optical disk 20' with regard to peak intensity, which is different from the shielding objective lens stated above. It is understood, from the examples shown in FIGS. 2–4 above, that there is light used for both the first optical disk and the second optical disk in common. Namely, a converging optical system has a split surface through which a light flux used in common for both reading/recording of the first optical disk and that of the second optical disk passes.

Figure 5:
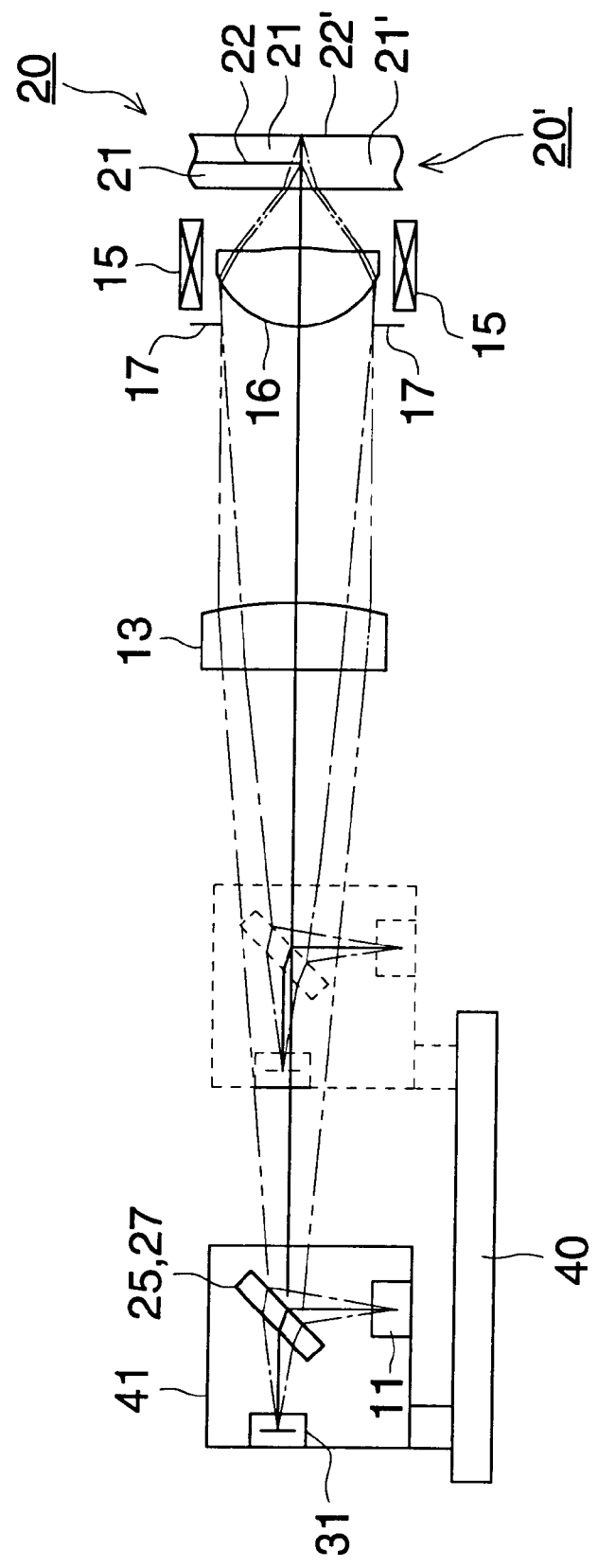
FIG. 5 is a schematic structure diagram of an optical pickup apparatus.

In the embodiment stated above, light sources used in the optical pickup apparatus include the first semiconductor laser 11 for recording/reading of the first optical disk 20 and the second semiconductor laser 12 for recording/reading of the second optical disk 20'. However, it is also possible to employ an arrangement wherein only the first semiconductor laser 11 is provided as a light source as shown in FIG. 5, namely, the first semiconductor laser 11 serves also as the second semiconductor laser 12 and is used for recording/reading of the second optical disk 20'.

The optical pickup apparatus stated above will be explained briefly as follows. Incidentally, functions, operations and members which are the same as those in the embodiment mentioned above are given the same numbers and explanation therefor may sometimes be omitted.

In this optical pickup apparatus, the first semiconductor laser 11 representing the first light source, optical detection means 31 and parallel plates 25 and 27 which serve also as changing means 25 and astigmatism generating element 27 respectively in the aforesaid embodiment are united solidly as unit 41. This unit 41 is provided to be capable of being moved by moving means 40. Since a single light source is used for recording/reading of both the first optical disk and the second optical disk, the second semiconductor laser 12, composing means 19, parallel plate 26 and optical detection means 32 are eliminated from the first embodiment.

In the case of recording/reading of the first optical disk, a light flux (shown with two-dot chain lines in FIG. 5) emitted from the first semiconductor laser 11 is deflected in terms of optical path by beam splitters 25 and 27, then is collimated by coupling lens 13 to be a collimated light flux (magnification m1=0 even in this case), then is narrowed by aperture 17, and is converged on the information recording surface by objective lens 16 through a transparent base board of the first optical disk. Then, a light flux reflected on the information recording surface passes again through the converging optical system (objective lens 16, coupling lens 13), then is given astigmatism by beam splitters 25 and 27, and enters optical detection means 31. Thus, signals outputted from the optical detection means 31 are used to obtain reading signals, focus error signals and tracking error signals.

When recording/reading of the second optical disk is conducted in the aforesaid optical pickup apparatus, unit 41 is moved (position shown with dotted lines in FIG. 5) by moving means 40 so that magnification m2 explained in the embodiment stated above may be obtained. Then, recording/reading of the second optical disk is conducted in the same way as in the foregoing. In FIG. 5, one-dot chain lines show the outermost light narrowed by aperture 17 (stated in the latter part) among light fluxes emitted from the first semiconductor laser 11 in recording/reading of the second optical disk.

As stated above, the optical pickup apparatus can be composed of a single light source and a single optical detector, which makes the optical pickup apparatus compact. It is also possible to arrange to change magnifications m1 and m2 by moving coupling lens 13 without moving a light source as in the present optical pickup apparatus.

Incidentally, in the explanation above, the relation between m1 and m2 is set to satisfy m2<m1, because thickness t1 of a transparent base board of the first optical disk having higher recording density is smaller than thickness t2 of a transparent base board of the second optical disk whose recording density is lower than that in the first optical disk. However, the relation can be set to satisfy m1<m2 when thickness t1 of a transparent base board of the first optical disk having higher recording density is greater than thickness t2 of a transparent base board of the second optical disk whose recording density is lower than that in the first optical disk.

(Embodiments Where a Working Distance is Constant)

First, prior to the explanation of the embodiment, optical pickup apparatus 10 shown in FIG. 18 which will be explained below is capable of conducting recording/reading of plural optical disks 20 having different thickness of transparent base board 21 representing optical information recording medium (hereinafter referred to as an optical disk) (wording of recording/reading means recording of information on the information recording surface 22 of optical disk 20 or reproducing information stored on the information recording surface 22). As these plural optical disks 20, there will be given explanation for the first optical disk having a t1-thick transparent base board and the second optical disk having a transparent base board whose thickness is t2 that is different from thickness t1 of a transparent base board of the first optical disk. Let it be assumed that NA1 represents numerical aperture on the optical disk side of a converging optical system (stated later) which is needed for recording/reading of the first optical disk, while NA2 represents numerical aperture on the optical disk side of a converging optical system which is needed for recording/reading of the second optical disk (NA1>NA2 in the following explanation, because the first optical disk is an information recording medium whose density is higher than that in the second optical disk).

In the following explanation, DVD (including DVD-RAM) means the first optical disk having a transparent base board thickness t1=0.6 mm (DVD includes a single-sided type and a two-sided type, and in both types, t1-thick transparent base board is stuck on each of both sides of an information recording surface, resulting in the thickness of DVD itself that is 1.2 mm), and CD (including CD-R) means the second optical disk wherein t2 is 1.2 mm (namely t1<t2).

(First Embodiment Wherein a Working Distance is Constant)

The first embodiment will be explained. FIG. 18 is a schematic structure diagram of optical pickup apparatus 10. The optical pickup apparatus in FIG. 18 is mostly the same as optical pickup apparatus shown in FIG. 1 except that WD is constant. Therefore, the details thereof conform to the explanation of FIG. 1.

Next, recording/reading of the first optical disk in the optical pickup apparatus shown in FIG. 18 will be explained as follows.

A light flux (shown with two-dot chain lines in FIG. 18) emitted from first semiconductor laser 11 passes through polarizing beam splitter 25, then is deflected in terms of optical path toward a converging optical system by dichroic prism 19, and enters the converging optical system. The light flux emitted from the first semiconductor laser 11 and entered the converging optical system is changed in terms of divergence by collimator lens 13, namely, changed to a collimated light flux in the present embodiment. The light flux changed in terms of divergence to be collimated by the collimator lens 13 is narrowed by aperture 17, and is converged on the information recording surface by objective lens 16 through a transparent base board of the first optical disk. When recording on the first optical disk, this converged beam spot is used for recording.

Then, the light flux reflected on the information recording surface passes again through the converging optical system (objective lens 16, collimator lens 13), then is changed in terms of optical path by dichroic prism 19 and polarizing beam splitter 25, and is given astigmatism by cylindrical lens 27 to enter optical detection means 31. When reproducing the first optical disk, signals outputted from the optical detection means 31 are used to obtain reading signals of information recorded on the first optical disk. Further, changes in light amount distribution caused by changes in spot forms on the optical detection means 31 are detected to obtain focus error signals and tracking error signals. Objective lens 16 is moved by two-dimensional actuator (for focusing control) 15 based on the focus error signals thus obtained so that a light flux emitted from the first semiconductor laser 11 may form images on the information recording surface of the first optical disk. In addition, objective lens 16 is moved by two-dimensional actuator (for tracking control) 15 based on the tracking error signals thus obtained so that a light flux emitted from the first semiconductor laser 11 may form images on the prescribed track of the first optical disk.

In the aforesaid manner, information on the information recording surface of the first optical disk is recorded, and information on the information recording surface of the first optical disk is reproduced.

In the same way as in the foregoing, in the case of recording/reading of the second optical disk, a light flux (shown with one-dot chain lines in FIG. 18) emitted from second semiconductor laser 12 is deflected in terms of optical path by parallel plate 26, then passes through dichroic prism 19, collimator lens 13, (narrowed by aperture 17), and objective lens 16, and is converged on the information recording surface through a transparent base board of the second optical disk. Then, the light flux reflected on the information recording surface passes again through the converging optical system (objective lens 16, collimator lens 13) and dichroic prism 19, then is given astigmatism by parallel plate 26 and enters optical detection means 32. Then, signals outputted from the optical detection means 32 are used to obtain reading signals, focus error signals and tracking error signals. Objective lens 16 is moved by two-dimensional actuator (for focusing control) 15 based on the focus error signals thus obtained so that a light flux emitted from the second semiconductor laser 12 may form images on the information recording surface of the second optical disk. In addition, objective lens 16 is moved by two-dimensional actuator (for tracking control) 15 based on the tracking error signals thus obtained so that a light flux emitted from the second semiconductor laser 12 may form images on the prescribed track of the second optical disk.

In the aforesaid manner, information on the information recording surface of the second optical disk is recorded, and information on the information recording surface of the second optical disk is reproduced.

When conducting recording/reading of the second optical disk with optical pickup apparatus 10 (with one converging optical system), if an optical disk is placed on an unillustrated tray with a standard of the surface (surface closer to objective lens 16) which is opposite to the information recording surface of the transparent base board, the position of the information recording surface of the first optical disk is different from that of the second optical disk, because the first optical disk is different from the second optical disk in terms of a thickness of the transparent base board. Therefore (though the difference of transparent base board thickness affects), when the position of the second semiconductor laser 12 is arranged to the position which is equivalent to the position of the first semiconductor laser 11, it is necessary to let an electric current flow constantly through two-dimensional actuator (for focusing control) and thereby to move a position of objective lens 16 to the position which is different from that for recording/reading of the first optical disk, for the purpose to cause a light flux emitted from the second semiconductor laser 12 to be converged on the information recording surface of the second optical disk through a converging optical system.

In other words, it is necessary to apply offset on the two-dimensional actuator 15 so that a distance (working distance, also called WD) from the last refracted surface (the surface of objective lens 16 on the optical disk side in the present embodiment) to the transparent base board may differ between recording/reading of the first optical disk and that of the second optical disk, and this leads to an increase of power consumption, and the two-dimensional actuator 15 is required to be large because it serves as objective lens 16. Incidentally, when the first optical disk is DVD and the second optical disk is CD, a thickness of DVD (≈1.2 mm, a 0.6 mm-thick transparent base board is stuck on each side of the information recording surface of DVD) is the same as that of CD (≈1.2 mm). Therefor, even when the position of the tray (standard surface) is on the opposite side, the same problem is caused.

In the present embodiment, therefore, the second semiconductor laser 12 is arranged so that WD in recording/reading of the second optical disk is mostly the same as WD in recording/reading of the first optical disk. Namely, the first semiconductor laser 11 and the second semiconductor laser 12 are arranged so that WD in recording/reading of the first optical disk may mostly be the same as WD in recording/reading of the second optical disk. Due to this, in the present embodiment, it is not necessary in recording/reading of the second optical disk to move the position of objective lens 16 to the position which is different from that for recording/reading of the first optical disk, which results in less power consumption and a compact optical pickup apparatus.

Since objective lens 16 is moved originally in the optical axis direction in the course of focusing, when it is mentioned that WD in recording/reading of the first optical disk is made to be mostly the same as WD in recording/reading of the second optical disk, it means that the positional accuracy is ±0.2 mm or less.

As stated above, owing to an arrangement of the first semiconductor laser 11 and the second semiconductor laser 12, divergence changing optical element 13 in the present embodiment functions for a light flux emitted from the first semiconductor laser 11 as a collimator lens which changes divergence to make a collimated light flux, but it has only a function to change divergence (not functioning as a collimator lens) for a light flux emitted from the second semiconductor laser 12. To be in more detail, divergence changed by the divergence changing optical element 13 is made smaller for a light flux emitted from the second semiconductor laser 12 than for a light flux emitted from the first semiconductor laser 11. In particular, in the present embodiment, it is preferable that a light flux emitted from the first semiconductor laser 11 is made to be a collimated light flux by the divergence changing optical element 13 because of NA1>NA2, and in this case, a light flux emitted from the first second semiconductor laser 12 turns to be a divergent light flux as shown in FIG. 18.

Further, with regard to an arrangement of the first semiconductor laser 11 and the second semiconductor laser 12, when assuming that image forming magnification of a converging optical system for a light flux emitted from the first semiconductor laser 11 in recording/reading of the first optical disk is m1, image forming magnification of a converging optical system for a light flux emitted from the second semiconductor laser 12 in recording/reading of the second optical disk is m2, the focal length of the converging optical system is f mm, a refractive index of a transparent base board of the first optical disk for wavelength $\lambda 1$ of the first semiconductor laser 11 is n1, and a refractive index of a transparent base board of the second optical disk for wavelength $\lambda 2$ of the second semiconductor laser 12 is n2, it is preferable to satisfy the following relation.

$$|(m2-m1)f-t1/n1+t2/n2|<0.25 \text{ mm}$$

When this relation is satisfied, it is not necessary to let an electric current flow through two-dimensional actuator (for focusing control) 15, which results in achievement of small power consumption.

For the purpose not to make the two-dimensional actuator 15 to be large in size, it is further preferable to satisfy the following relation.

$$|(m2-m1)f-t1/n1+t2/n2|<0.25 \text{ mm}$$

(Second Embodiment Wherein a Working Distance is Constant)

Next, the second embodiment will be explained with reference to FIG. 19 which is a schematic structure diagram of optical pickup apparatus 10. In the first embodiment, each of semiconductor lasers 11 and 12 is arranged in the way stated above for solving the problem by using the first semiconductor laser 11 and the second semiconductor laser 12 as a light source. In the present embodiment, however, the first semiconductor laser 11 only is used as a light source for solving the problem. Namely, in the first embodiment, a light source and an optical detection means are provided for each of the first optical disk and the second optical disk, so that they correspond to each of the first optical disk and the second optical disk. In the present embodiment, one light source 11 and one optical detection means 31 are provided, and functions, operations and members which are the same as those in the first embodiment are given the same numbers as in the first embodiment, and explanation therefor may be omitted here at times, except the following explanation. Since an optical pickup apparatus shown in FIG. 19 is mostly the same as one shown in FIG. 5 except that WD is constant, details of the optical pickup apparatus conform to the explanation of FIG. 5.

In the case of recording/reading of the second optical disk conducted by the optical pickup apparatus mentioned above, unit 41 is moved (to the position shown with dotted lines in FIG. 19) by moving means 40 so that WD therefor may become the same as WD for recording/reading of the first optical disk. Then, recording/reading of the second optical disk is conducted in the same way as in the foregoing. Incidentally, one-dot chain lines in FIG. 19 show an outermost light flux narrowed by aperture 17 (described later) among light fluxes emitted from the first semiconductor laser 11 in recording/reading of the second optical disk. As stated above, it is not necessary, in the present embodiment, to move objective lens 16 to the position which is different from that for recording/reading of the first optical disk (to apply bias to the two-dimensional actuator 15) in the case of recording/reading of the second optical disk, which results in less power consumption and a compact optical pickup apparatus.

(Preferable Objective Lens)

Next, with reference to FIG. 20, there will be explained objective lens 16 which is used preferably for optical pickup apparatus 10 in the first and second embodiments mentioned above wherein the working distance is constant. FIG. 20(a) is a diagram showing illustratively how images are formed on the first optical disk by a light flux which passes through objective lens 16 in recording/reading of the first optical disk, FIG. 20(b) is a diagram of objective lens 16 viewed from a light source, and FIG. 20(c) is a diagram showing illustratively how images are formed on the second optical disk by a light flux which passes through objective lens 16 in recording/reading of the second optical disk.

In the present embodiment, objective lens 16 is a convex lens which has aspherical refraction surface S1 on the light source side and aspherical refraction surface S2 (last refraction surface) on the optical disk side and has positive refraction power. The refraction surface S1 of the objective lens 16 is composed of plural (three in the present embodiment) split surfaces, first split surface Sd1—third split surface Sd3, which are coaxial with an optical axis, and a boundary between the split surfaces Sd1–Sd2 is provided with a step.

In the case of recording/reading of the first optical disk (see FIG. 20(a)), the first light flux and the third light flux (shown with hatched lines) passing respectively through the first split surface Sd1 and the third split surface Sd3 form images, through the objective lens 16 in the present embodiment, on image-forming positions which are mostly the same each other. In this case, the second light flux (shown with dotted lines) passing through the second split surface Sd2 forms images on the image forming position which is different from those for the first and third light fluxes (namely, images are not formed on the information recording surface 22 of the first optical disk). For recording/reading of the first optical disk, therefore, the first and third light fluxes are converged on the information recording surface 22 of the first optical disk to form beams which are reflected and detected by optical detection means 30, thus focus error signals, tracking error signals and reading signals (information) are read as stated above.

Figure 20:
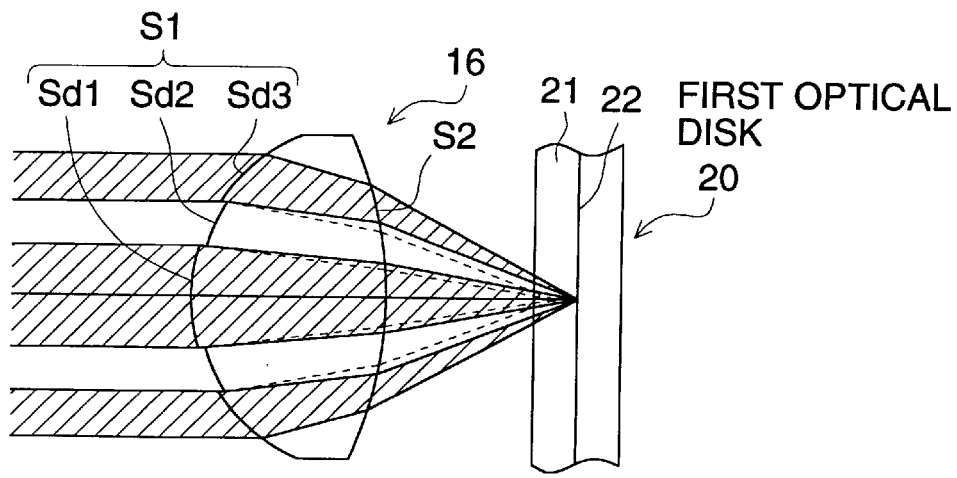
Figure 20:
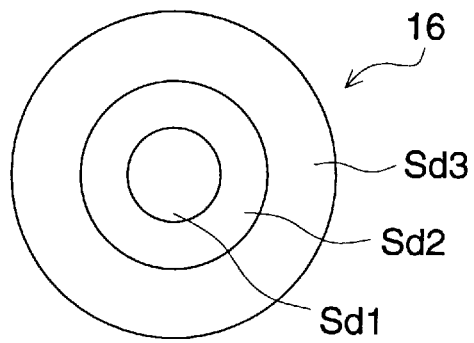
Figure 20:
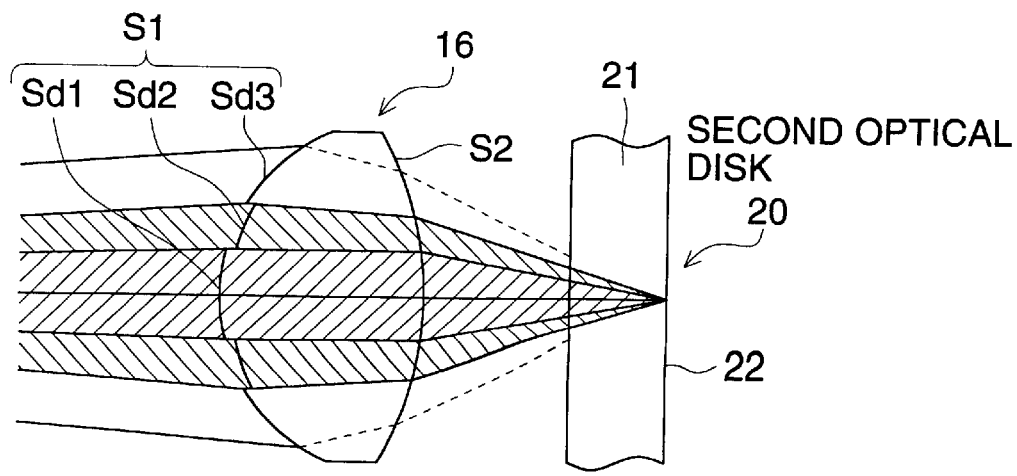

Therefore, in the case of recording/reading of the second optical disk (see FIG. 20(*c*)), the first light flux (shown with hatched lines inclined upward from left to right) and the second light flux (shown with hatched lines inclined downward from left to right) form images on the image forming positions (information recording surface on the second optical disk). In this case, flare is generated by the third light flux (shown part way with dotted lines). Accordingly, on the information recording surface 22 of the second optical disk, there is formed a core mainly formed by the first and the second light fluxes, and the core is surrounded by the flare generated by the third light flux to form a beam spot, and this core conducts recording/reading of the second optical disk.

In other words, in the objective lens 16 of the present embodiment, the first light flux passing through the vicinity of the optical axis having a small numerical aperture is used for recording/reading of all optical disks capable of being subjected to recording/reading, a light flux passing through the area outside the first split surface is split to correspond to each optical disk to be reproduced, and each split light flux is used for recording/reading of each optical disk (the first optical disk and the second optical disk in the present embodiment). In this case, a light flux to be used for recording/reading of the optical disk (the first optical disk) having greater necessary numerical aperture is designated to be a light flux (the third light flux) which is far from the first light flux among split fluxes.

Figure 21:
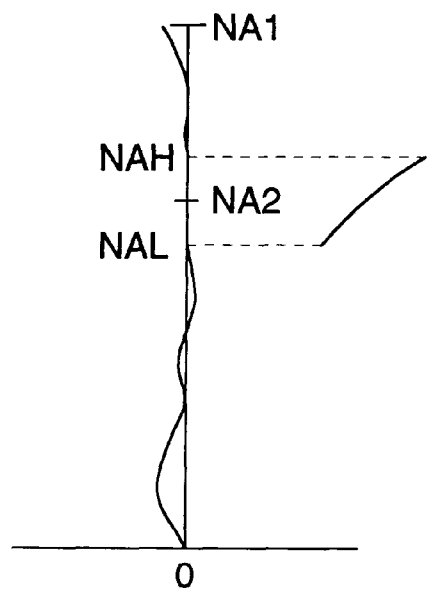
Figure 21:
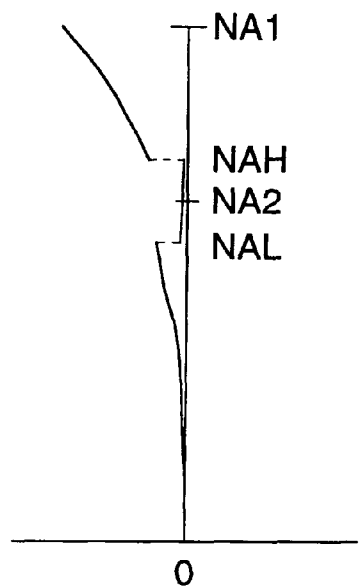

There is further given explanation with reference to FIG. 4 showing a diagram of spherical aberration on the information recording surface illustrating functions of the objective lens 16. FIG. 21(*a*) is a diagram showing illustratively spherical aberration caused in the course of recording/reading of DVD through a t1-thick transparent base board, and FIG. 21(*b*) is a diagram showing illustratively spherical aberration caused in the course of recording/reading of CD through a t2-thick transparent base board. Incidentally, the axis of ordinates represents the numerical aperture corresponding to that of the converging optical system on the optical disk side (last refraction surface S2). Numerical aperture NAL in the diagram represents the position closest to the optical axis in the second split surface Sd2, and it corresponds to a boundary section between the first split surface Sd1 and the second split surface Sd2, while numerical aperture NAH represents the position farthest from the optical axis in the second split surface Sd2, and it corresponds to a boundary section between the second split surface Sd2 and the third split surface Sd3.

As shown in FIG. 21(*a*), it is arranged so that in recording/reading of DVD, light fluxes passing respectively through the first split surface Sd1 and the third split surface Sd3 form images at image forming positions which mostly agree with each other, and a light flux passing through the second split surface Sd2 forms images at the position which does not agree with the aforesaid image forming positions. As shown in FIG. 21(*b*), it is further arranged so that a light flux passing through the second split surface Sd2 forms images between a position where a light flux passing through the vicinity of the optical axis in light fluxes passing through the first split surface Sd1 forms images and a position where a light flux passing through an edge portion of the first split surface Sd1 that is away from the optical axis in the direction perpendicular to the optical axis forms images.

On the objective lens 16 in the present embodiment, spherical aberration is changed to be discontinuous at at lease two aperture positions (two positions in the present embodiment) in the vicinity of the numerical aperture corresponding to necessary numerical aperture NA2. The direction of changing to be discontinuous at small numerical aperture NAL (position which is closest to the optical axis in the second split surface Sd2 and corresponds to a boundary section between the first split surface Sd1 and the second split surface Sd2) is opposite to that of changing to be discontinuous at large numerical aperture NAH (position which is farthest from the optical axis in the second split surface Sd2 and corresponds to a boundary section between the second split surface Sd2 and the third split surface Sd3).

On the objective lens 16 in the present embodiment, since spherical aberration is originally generated on the under side, when viewed from the smaller numerical aperture toward the larger numerical aperture, spherical aberration changes discontinuously in the positive direction at the numerical aperture NAL and it changes discontinuously in the negative direction at the numerical aperture NAH. Due to this, detection of a light flux reflected on DVD wherein thickness t1 of a transparent base board is small and detection of a light flux reflected on CD wherein thickness t2 of a transparent base board is great can be carried out properly. Incidentally, "spherical aberration changes discontinuously" means that sharp changes of spherical aberration are observed on the spherical aberration diagram.

When a spherical aberration diagram for recording/reading of CD is observed (FIG. 21(*b*)), the spherical aberrations between the numerical aperture NAL and the numerical aperture NAH are made to be of the same sign (over side for both in the present embodiment) as that of spherical aberrations for other numerical apertures (optical axis—numerical aperture NAL, numerical aperture NAH—necessary numerical aperture NA1). Due to this, focus error signals are further improved.

It is arranged in objective lens 16 of the present embodiment in terms of its form so that a light flux (the first light flux) passing through the first split surface Sd1 which is in the vicinity of an optical axis is used for recording/reading of the first optical disk and that of the second optical disk, a light flux (the second light flux) passing through the second split surface Sd2 which is outside the first split surface Sd1 is mainly used for recording/reading of the second optical disk, and a light flux (the third light flux) passing through the third split surface Sd3 which is outside the second split surface Sd2 is mainly used for recording/reading of the first optical disk.

In this case, the wording "mainly" means that a ratio of energy of core portion at the position where the central intensity on a beam spot shows its maximum value under the condition that a light flux passing through the third split surface Sd3 is blocked to energy of core portion at the position where the central intensity on a beam spot formed on optical detection means 30 shows its maximum value under the condition that a light flux passing through the third split surface Sd3 is not blocked ("core energy under blocked light"/"core energy under unblocked light") is within a range of 60%–100%, in the case of a light flux passing through the second split surface Sd2. Even in the case of a light flux passing through the third split surface Sd3, the wording "mainly" means that a ratio of energy of core portion under the condition that the second split surface Sd2 is shielded to energy of core portion under the condition that the second split surface Sd2 is not shielded ("core energy under blocked light"/"core energy under unblocked light") is within a range of 60%–100%. Incidentally, a simple method of measurement of this energy ratio is to measure peak intensity Ip at the position where the central intensity on a beam spot shows its maximum value and beam diameter Dp (at the position where the intensity is $e^{-2}$ for the central intensity) for each case, and to obtain Ip×Dp to compare it, because a form of a beam at the core portion is mostly constant.

Incidentally, though split surfaces Sd1–Sd3 are provided on refraction surface S1 of objective lens 16 on the light source side in the present embodiment, it is also possible to provide on refraction surface S2 on the optical disk side, or to provide on another element (for example, divergence changing optical element 13, composing means 19 or changing means 25 and 26), it is also possible to provide as a separate element.

Though there are provided steps at boundaries of the first split surface Sd1—the split surface Sd3 in the present embodiment, a step can be provided at one of the boundaries, or the surfaces can be connected not by steps but by curved surfaces having prescribed radiuses of curvature.

Though the second split surface Sd2 of objective lens 16 is made to be aspherical in the present embodiment as shown in FIG. 21(a), it may also be structured with a hologram (or a Fresnel lens). When the second split surface Sd2 is structured with a hologram, one of the light flux divided into zero-order light and first-order light is used for recording/reading of the first optical disk and the other of the light flux is used for recording/reading of the second optical disk. In this case, it is preferable that an amount of light of a flux used for recording/reading of the second optical disk is greater than an amount of light of a flux used for recording/reading of the first optical disk. Though the second split surface Sd2 is provided to be a ring (circle) coaxial with an optical axis in the present embodiment, the invention is not limited to this, and the second split surface Sd2 can also be of a concentric and elliptical form or of a split ring. Though the second split surface Sd2 is structured in the present embodiment to be given spherical aberration, it is also possible, in place of the foregoing or in addition to the foregoing, to arrange so that a difference in phase is provided, namely a phase of the light flux passing through the second split surface Sd2 is deviated from that of the light flux passing through the first split surface Sd1 and the third split surface Sd3.

EXAMPLES

Examples of the invention will be explained as follows. In the following Examples 1–6, structures including and following aperture 17 of objective lens 16 arranged on the light source side will be shown on the premise that there is used coupling lens 13 which, through optimum design thereof, can cause collimated light having no aberration to enter objective lens 16 which converges on the information recording surface 22 of the first optical disk 20. Therefore, in the table showing paraxial optical data, aperture 17 is assumed to be the first surface which is followed by surfaces arranged in the light advancing direction up to an information recording surface of an optical disk including i-th surface representing an arbitrary surface. Further, r represents a radius of curvature of the surface intersecting an optical axis, d represents a distance between the i-th surface and the (i+1)th surface, and n represents a refractive index under the condition of the wavelength of a light flux of a semiconductor laser to be used. Incidentally, the sign which is positive represents the light advancing direction.

Aspherical surface data shown in the table in each of the following examples are based on the following expression of an aspherical surface.

$$X = (H^2/r) / \left[1 + \sqrt{1 - (1+K)(H/r)^2}\right] + \sum_j A_j H^{P_j}$$

In the expression above, X represents an axis in the direction of an optical axis, H represents an axis in the direction perpendicular to the optical axis, the sign which is positive represents the light advancing direction, K represents the constant of the cone, Aj represents a coefficient of an aspherical surface, and Pj represents the power number of an aspherical surface.

A wave front aberration diagram in each of the following examples is one viewed under the condition that defocusing is made at the position where the best wave front aberration is obtained.

Example 1

Figure 1:
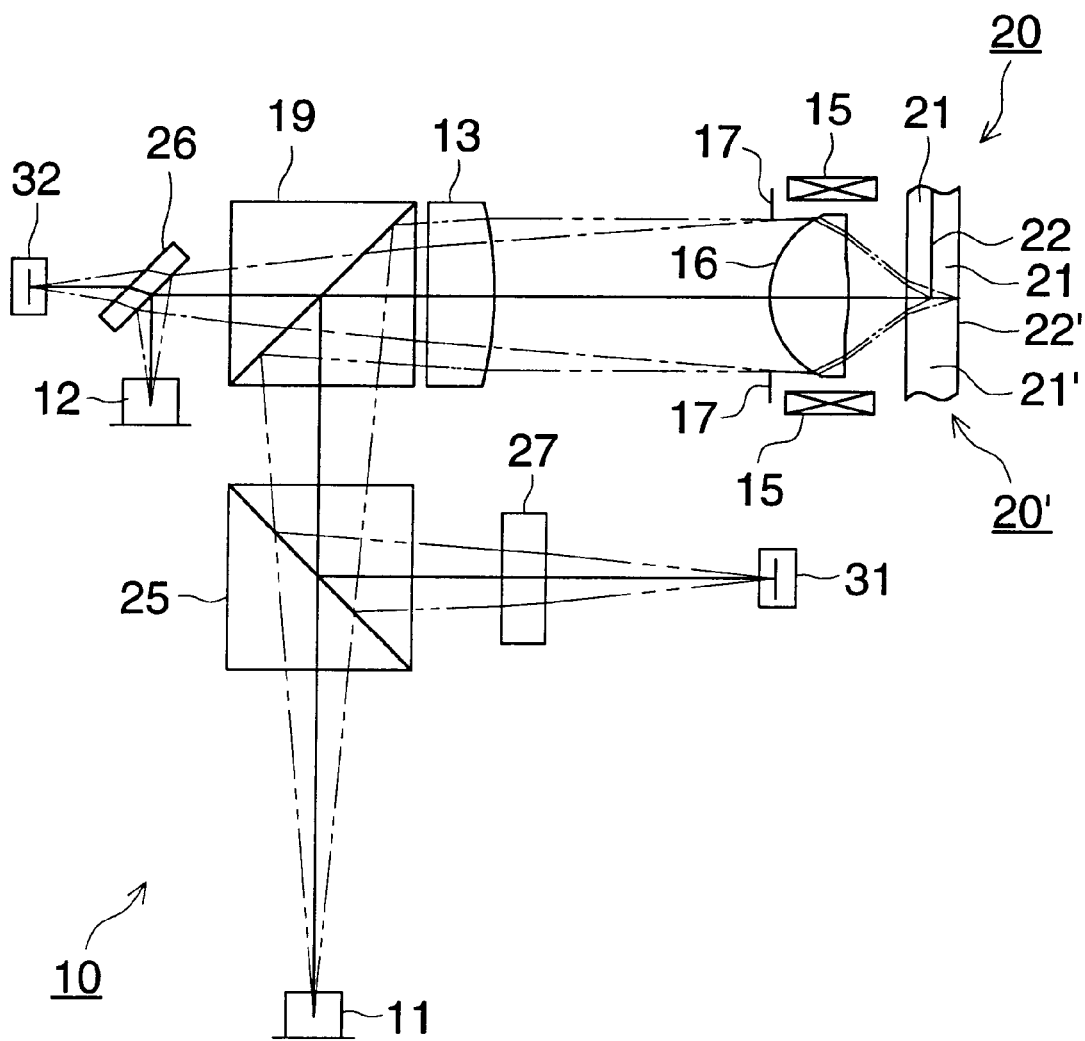
FIG. 1 is a schematic structure diagram of an optical pickup apparatus.

Example 1 represents an optical pickup apparatus shown in FIG. 1 wherein 3-area objective lens 16 is provided and DVD is used as the first optical disk and CD (reading of CD-R) is used as the second optical disk.

Table 2 shows paraxial optical data.

TABLE 2

| Media | DVD | CD, CD-R |
|---|---|---|
| Wavelength | 635 nm | 780 nm |
| Aperture diameter | φ 4.04 | φ 4.04 |
| Lateral magnification of objective lens | m1 = 0 | m2 = −0.02778 |

| I | r | d1 | n1 | d3 | n3 |
|---|---|---|---|---|---|
| 1 | ∞ | 0.00 | 1.0000 | 0.00 | 1.0000 |
| 2 | 2.114 | 2.20 | 1.5383 | 2.20 | 1.5336 |
| 3 | −7.963 | 1.76 | 1.0000 | 1.48 | 1.0000 |
| 4 | ∞ | 0.60 | 1.5800 | 1.20 | 1.5500 |
| 5 | ∞ |  | 1.0000 |  | 1.0000 |

Table 3 shows aspherical surface data.

TABLE 3

| Aspherical surface data | | |
|---|---|---|
| Second surface | First aspherical surface | 0 < H <1.401 (First split surface) |
| | | 1.566 ≤ H (Third split surface) |
| | | κ = −0.97770 |
| | | A1 = 0.63761 × 10$^{-3}$   P1 = 3.0 |
| | | A2 = 0.36688 × 10$^{-3}$   P2 = 4.0 |
| | | A3 = 0.83511 × 10$^{-2}$   P3 = 5.0 |
| | | A4 = −0.37296 × 10$^{-2}$  P4 = 6.0 |
| | | A5 = 0.46548 × 10$^{-3}$   P5 = 8.0 |
| | | A6 = −0.43124 × 10$^{-4}$  P6 = 10.0 |
| | Second aspherical surface | 1.401 ≤ H <1.566 (Second split surface) |
| | | d2 = 2.1995 |
| | | κ = −0.13290 × 10$^{1}$ |
| | | A1 = 0.10694 × 10$^{-1}$   P1 = 3.0 |
| | | A2 = −0.21612 × 10$^{-1}$  P2 = 4.0 |
| | | A3 = 0.35177 × 10$^{-1}$   P3 = 5.0 |

TABLE 3-continued

Aspherical surface data

|  | | |
|---|---|---|
| | A4 = -0.14405 × 10⁻¹ | P4 = 6.0 |
| | A5 = 0.12913 × 10⁻² | P5 = 8.0 |
| | A6 = -0.86517 × 10⁻⁴ | P6 = 10.0 |
| Third surface | κ = -0.24914 × 10² | |
| | A1 = 0.13775 × 10⁻² | P1 = 3.0 |
| | A2 = -0.41269 × 10⁻² | P2 = 4.0 |
| | A3 = 0.21236 × 10⁻¹ | P3 = 5.0 |
| | A4 = -0.13895 × 10⁻¹ | P4 = 6.0 |
| | A5 = 0.16631 × 10⁻² | P5 = 8.0 |
| | A6 = -0.12138 × 10⁻³ | P6 = 10.0 |

Incidentally, "d2=2.1995" in Second aspherical surface in Table 3 indicates a distance on the optical axis from an intersecting point between a form of the second aspherical surface (the second split surface) extended to the optical axis in accordance with the expression of an aspherical surface form and the optical axis to the succeeding surface.

Figure 7:
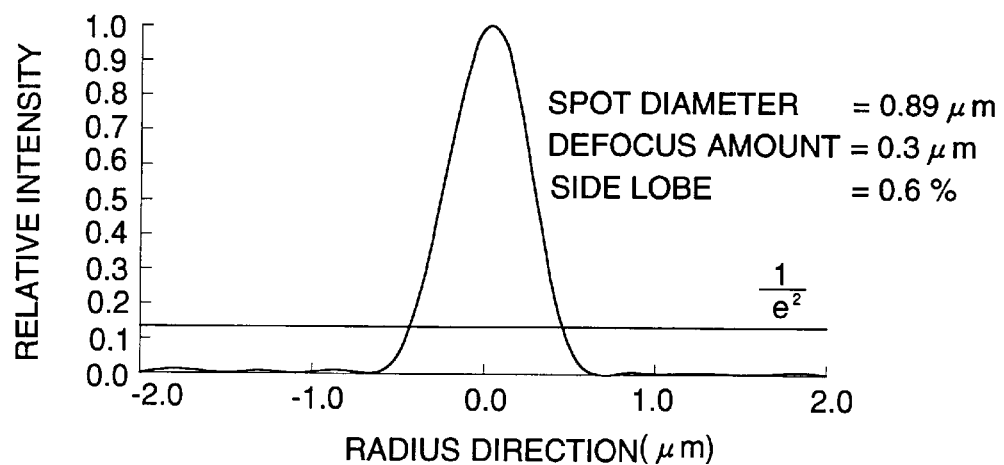
Figure 7:
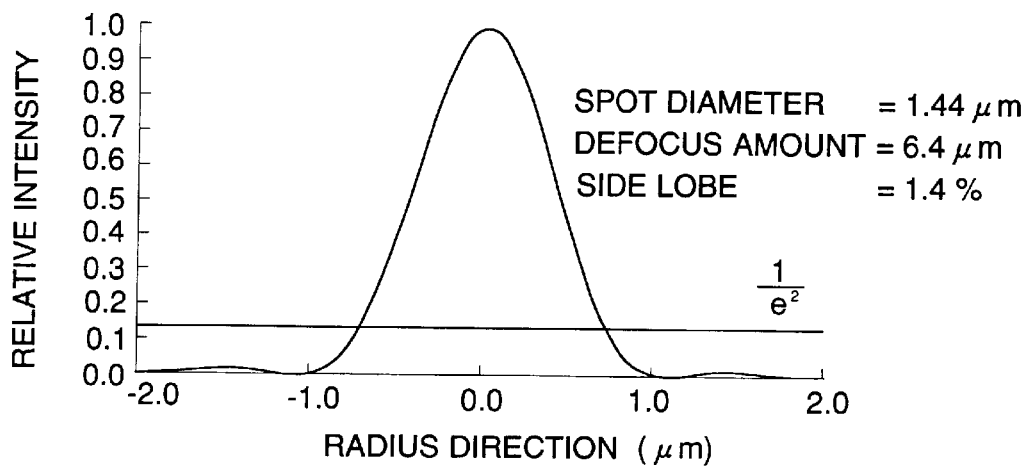

FIG. 6($a$) shows a diagram of spherical aberration in DVD reading, FIG. 6($b$) shows a diagram of spherical aberration in CD reading, 6($c$) shows a diagram of wave front aberration in DVD reading, and FIG. 6($d$) shows a diagram of wave front aberration in CD reading. FIG. 7($a$) represents a diagram of relative intensity distribution of converged spot in the case where the best spot form was obtained in reading of DVD, and FIG. 7($b$) represents a diagram of relative intensity distribution of converged spot in the case where the best spot form was obtained in reading of CD. In the present example, difference δ between spherical aberration amount SA3 (1) generated on a light flux passing through the first split surface Sd1 at the position of numerical aperture NA3 in recording/reading of CD and spherical aberration amount SA4 (3) generated on a light flux passing through the third split surface Sd3 at the position of numerical aperture NA4 is represented by δ=0.0040 mm.

As is apparent from the foregoing, DVD and CD (CD-R) can be reproduced properly in the present example.

Example 2

Example 2 represents an optical pickup apparatus shown in FIG. 1 wherein 3-area objective lens 16 is provided and DVD is used as the first optical disk and CD (reading of CD-R) is used as the second optical disk. The 3-area objective lens 16 is one wherein a phase difference of $2\pi$ exists between the first split surface Sd1 and the third split surface Sd3. In this case, for calculation (measurement) of the rms value of wave front aberration, n which makes the rms value minimum is used with phase difference $2n\pi$ serving as a parameter.

Table 4 shows paraxial optical data.

TABLE 4

| Media | DVD | CD, CD-R |
|---|---|---|
| Wavelength | 635 nm | 780 nm |
| Aperture diameter | φ 4.04 | φ 4.04 |
| Lateral magnification of objective lens | m1 = 0 | m2 = -0.02778 |

| I | r | d1 | n1 | d3 | n3 |
|---|---|---|---|---|---|
| 1 | ∞ | 0.00 | 1.0000 | 0.00 | 1.0000 |
| 2 | 2.114 | 2.20 | 1.5383 | 2.20 | 1.5336 |
| 3 | -7.963 | 1.76 | 1.0000 | 1.48 | 1.0000 |

TABLE 4-continued

| 4 | ∞ | 0.60 | 1.5800 | 1.20 | 1.5500 |
|---|---|---|---|---|---|
| 5 | ∞ | | 1.0000 | | 1.0000 |

Table 5 shows aspherical surface data.

TABLE 5

Aspherical surface data

| Second surface | First aspherical surface | 0 < H <1.401 (First split surface) | |
|---|---|---|---|
| | | d1 = 2.200 | |
| | | κ = -0.97770 | |
| | | A1 = 0.63761 × 10⁻³ | P1 = 3.0 |
| | | A2 = 0.36688 × 10⁻³ | P2 = 4.0 |
| | | A3 = 0.83511 × 10⁻² | P3 = 5.0 |
| | | A4 = -0.37296 × 10⁻² | P4 = 6.0 |
| | | A5 = 0.46548 × 10⁻³ | P5 = 8.0 |
| | | A6 = -0.43124 × 10⁻⁴ | P6 = 10.0 |
| | Second aspherical surface | 1.401 ≦ H <1.566 (Second split surface) | |
| | | d2 = 2.19975 | |
| | | κ = -0.13290 × 10¹ | |
| | | A1 = 0.10694 × 10⁻¹ | P1 = 3.0 |
| | | A2 = -0.21612 × 10⁻¹ | P2 = 4.0 |
| | | A3 = 0.35177 × 10⁻¹ | P3 = 5.0 |
| | | A4 = -0.14405 × 10⁻¹ | P4 = 6.0 |
| | | A5 = 0.12913 × 10⁻² | P5 = 8.0 |
| | | A6 = -0.86517 × 10⁻⁴ | P6 = 10.0 |
| | Third aspherical surface | 1.566 ≦ H (Third split surface) | |
| | | d3 = 2.2014 | |
| | | κ = -0.97770 | |
| | | A1 = 0.63761 × 10⁻³ | P1 = 3.0 |
| | | A2 = 0.36688 × 10⁻³ | P2 = 4.0 |
| | | A3 = 0.83511 × 10⁻² | P3 = 5.0 |
| | | A4 = -0.37296 × 10⁻² | P4 = 6.0 |
| | | A5 = 0.46548 × 10⁻³ | P5 = 8.0 |
| | | A6 = -0.43124 × 10⁻⁴ | P6 = 10.0 |
| Third surface | | κ = -0.24914 × 10² | |
| | | A1 = 0.13775 × 10⁻² | P1 = 3.0 |
| | | A2 = -0.41269 × 10⁻² | P2 = 4.0 |
| | | A3 = 0.21236 × 10⁻¹ | P3 = 5.0 |
| | | A4 = -0.13895 × 10⁻¹ | P4 = 6.0 |
| | | A5 = 0.16631 × 10⁻² | P5 = 8.0 |
| | | A6 = -0.12138 × 10⁻³ | P6 = 10.0 |

Incidentally, "d2=2.19975" in Second aspherical surface in Table 5 indicates a distance on the optical axis from an intersecting point between a form of the second aspherical surface (the second split surface) extended to the optical axis in accordance with the expression of an aspherical surface form and the optical axis to the succeeding surface. Further, "d3=2.2014" in Third aspherical surface in Table 5 indicates a distance on the optical axis from an intersecting point between a form of the third aspherical surface (the third split surface) extended to the optical axis in accordance with the expression of an aspherical surface form and the optical axis to the succeeding surface.

Figure 9:
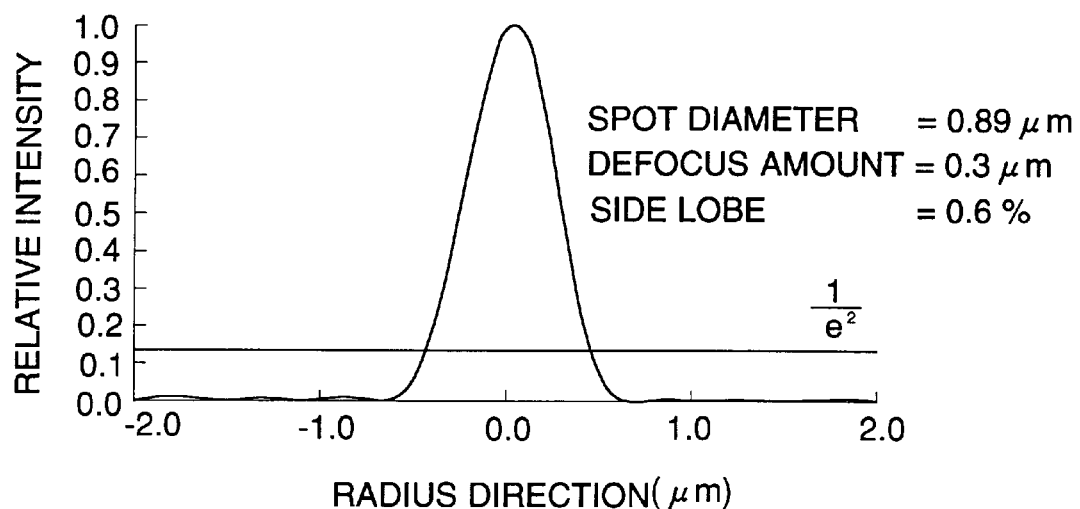
Figure 9:
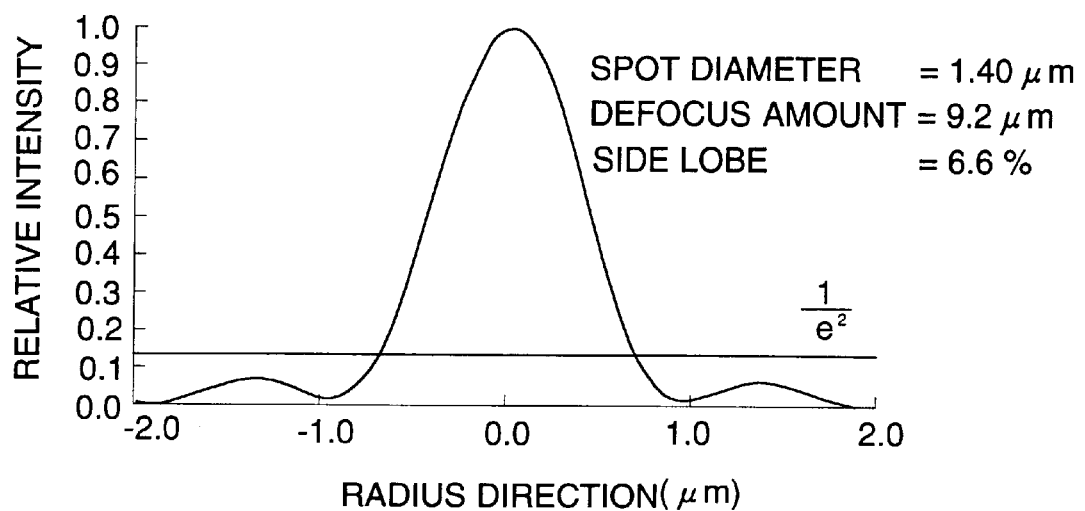

FIG. 8($a$) shows a diagram of spherical aberration in DVD reading, FIG. 8($b$) shows a diagram of spherical aberration in CD reading, 8($c$) shows a diagram of wave front aberration in DVD reading, and FIG. 8($d$) shows a diagram of wave front aberration in CD reading. FIG. 9($a$) represents a diagram of relative intensity distribution of converged spot in the case where the best spot form was obtained in reading of DVD, and FIG. 9($b$) represents a diagram of relative intensity distribution of converged spot in the case where the best spot form was obtained in reading of CD. In the present example, difference δ between spherical aberration amount SA3 (1) generated on a light flux passing through the first split surface Sd1 at the position of numerical aperture NA3 in recording/reading of CD and spherical aberration amount SA4 (3) generated on a light flux passing through the third split surface Sd3 at the position of numerical aperture NA4 is represented by δ=0.0033 mm.

As is apparent from the foregoing, DVD and CD (CD-R) can be reproduced properly in the present example.

Example 3

Example 3 represents an optical pickup apparatus shown in FIG. 1 wherein 3-area objective lens 16 is provided and DVD is used as the first optical disk and LD is used as the second optical disk.

Table 6 shows paraxial optical data.

TABLE 6

| Media | DVD | CD, CD-R |
|---|---|---|
| Wavelength | 635 nm | 780 nm |
| Aperture diameter | φ 4.04 | φ 4.04 |
| Lateral magnification of objective lens | m1 = 0 | m2 = −0.029 |

| I | r | d1 | n1 | d2 | n2 |
|---|---|---|---|---|---|
| 1 | ∞ | 0.00 | 1.0000 | 0.00 | 1.0000 |
| 2 | 2.114 | 2.20 | 1.5383 | 2.20 | 1.5336 |
| 3 | −7.963 | 1.76 | 1.0000 | 1.42 | 1.0000 |
| 4 | ∞ | 0.60 | 1.5800 | 1.25 | 1.4862 |
| 5 | ∞ |  | 1.0000 |  | 1.0000 |

Table 7 shows aspherical surface data.

TABLE 7

| | | Aspherical surface data | |
|---|---|---|---|
| Second surface | First aspherical surface | 0 < H <1.512 (First split surface) 1.747 ≦ H (Third split surface) κ = −0.97770 | |
| | | A1 = 0.63761 × 10$^{-3}$ | P1 = 3.0 |
| | | A2 = 0.36688 × 10$^{-3}$ | P2 = 4.0 |
| | | A3 = 0.83511 × 10$^{-2}$ | P3 = 5.0 |
| | | A4 = −0.37296 × 10$^{-2}$ | P4 = 6.0 |
| | | A5 = 0.46548 × 10$^{-3}$ | P5 = 8.0 |
| | | A6 = −0.43124 × 10$^{-4}$ | P6 = 10.0 |
| | Second aspherical surface | 1.512 ≦ H <1.747 (Second split surface) d2 = 2.1996 κ = −0.97633 | |
| | | A1 = 0.58178 × 10$^{-3}$ | P1 = 3.0 |
| | | A2 = 0.38447 × 10$^{-3}$ | P2 = 4.0 |
| | | A3 = 0.83731 × 10$^{-2}$ | P3 = 5.0 |
| | | A4 = −0.37151 × 10$^{-2}$ | P4 = 6.0 |
| | | A5 = 0.46882 × 10$^{-3}$ | P5 = 8.0 |
| | | A6 = −0.43010 × 10$^{-4}$ | P6 = 10.0 |
| Third surface | | κ = −0.24914 × 10$^{2}$ | |
| | | A1 = 0.13775 × 10$^{-2}$ | P1 = 3.0 |
| | | A2 = −0.41269 × 10$^{-2}$ | P2 = 4.0 |
| | | A3 = 0.21236 × 10$^{-1}$ | P3 = 5.0 |
| | | A4 = −0.13895 × 10$^{-1}$ | P4 = 6.0 |
| | | A5 = 0.16631 × 10$^{-2}$ | P5 = 8.0 |
| | | A6 = −0.12138 × 10$^{-3}$ | P6 = 10.0 |

Incidentally, "d2=2.19961" in Second aspherical surface in Table 7 indicates a distance on the optical axis from an intersecting point between a form of the second aspherical surface (the second split surface) extended to the optical axis in accordance with the expression of an aspherical surface form and the optical axis to the succeeding surface.

FIG. 10(a) shows a diagram of spherical aberration in DVD reading, FIG. 10(b) shows a diagram of spherical aberration in CD reading, 10(c) shows a diagram of wave front aberration in DVD reading, and FIG. 10(d) shows a diagram of wave front aberration in LD reading. FIG. 11(a) represents a diagram of relative intensity distribution of converged spot in the case where the best spot form was obtained in reading of DVD, and FIG. 11(b) represents a diagram of relative intensity distribution of converged spot in the case where the best spot form was obtained in reading of LD. In the present example, difference δ between spherical aberration amount SA3 (1) generated on a light flux passing through the first split surface Sd1 at the position of numerical aperture NA3 in recording/reading of LD and spherical aberration amount SA4 (3) generated on a light flux passing through the third split surface Sd3 at the position of numerical aperture NA4 is represented by δ=0.0066 mm.

As is apparent from the foregoing, DVD and CD (CD-R) can be reproduced properly in the present example.

Example 4

Example 4 represents an optical pickup apparatus shown in FIG. 5 wherein 3-area objective lens 16 is provided and DVD is used as the first optical disk and MO is used as the second optical disk.

Table 8 shows paraxial optical data.

TABLE 8

| Media | DVD | MO |
|---|---|---|
| Wavelength | 635 nm | 635 nm |
| Aperture diameter | φ 4.04 | φ 4.04 |
| Lateral magnification of objective lens | m1 = 0 | m2 = −0.0023 |

| I | r | d1 | n1 | d2 | n2 |
|---|---|---|---|---|---|
| 1 | ∞ | 0.00 | 1.0000 | 0.00 | 1.0000 |
| 2 | 2.114 | 2.20 | 1.5383 | 2.20 | 1.5383 |
| 3 | −7.963 | 1.76 | 1.0000 | 1.41 | 1.0000 |
| 4 | ∞ | 0.60 | 1.5800 | 1.20 | 1.4901 |
| 5 | ∞ |  | 1.0000 |  | 1.0000 |

Table 9 shows aspherical surface data.

TABLE 9

| | | Aspherical surface data | |
|---|---|---|---|
| Second surface | First aspherical surface | 0 < H <1.411 (First split surface) 1.747 ≦ H (Third split surface) κ = −0.97770 | |
| | | A1 = 0.63761 × 10$^{-3}$ | P1 = 3.0 |
| | | A2 = 0.36688 × 10$^{-3}$ | P2 = 4.0 |
| | | A3 = 0.83511 × 10$^{-2}$ | P3 = 5.0 |
| | | A4 = −0.37296 × 10$^{-2}$ | P4 = 6.0 |
| | | A5 = 0.46548 × 10$^{-3}$ | P5 = 8.0 |
| | | A6 = −0.43124 × 10$^{-4}$ | P6 = 10.0 |
| | Second aspherical surface | 1.411 ≦ H <1.747 (Second split surface) d2 = 2.1997 κ = −0.97337 | |
| | | A1 = 0.57492 × 10$^{-3}$ | P1 = 3.0 |
| | | A2 = 0.42381 × 10$^{-3}$ | P2 = 4.0 |
| | | A3 = 0.84030 × 10$^{-2}$ | P3 = 5.0 |
| | | A4 = −0.36994 × 10$^{-2}$ | P4 = 6.0 |
| | | A5 = 0.47050 × 10$^{-3}$ | P5 = 8.0 |
| | | A6 = −0.43823 × 10$^{-4}$ | P6 = 10.0 |
| Third surface | | κ = −0.24914 × 10$^{2}$ | |
| | | A1 = 0.13775 × 10$^{-2}$ | P1 = 3.0 |
| | | A2 = −0.41269 × 10$^{-2}$ | P2 = 4.0 |
| | | A3 = 0.21236 × 10$^{-1}$ | P3 = 5.0 |
| | | A4 = −0.13895 × 10$^{-1}$ | P4 = 6.0 |
| | | A5 = 0.16631 × 10$^{-2}$ | P5 = 8.0 |
| | | A6 = −0.12138 × 10$^{-3}$ | P6 = 10.0 |

Incidentally, "d2=2.1997" in Second aspherical surface in Table 9 indicates a distance on the optical axis from an intersecting point between a form of the second aspherical surface (the second split surface) extended to the optical axis in accordance with the expression of an aspherical surface form and the optical axis to the succeeding surface.

Figures 12A, 12B:
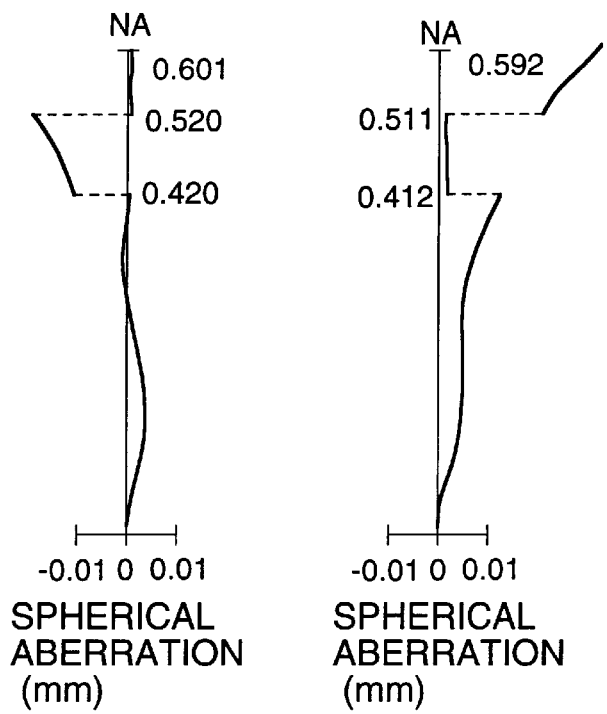
Figures 12C, 12D:
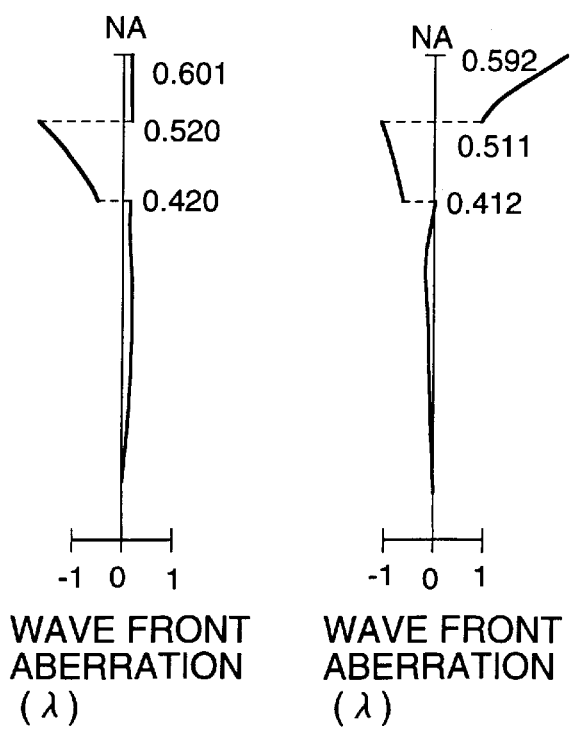

FIG. 12(a) shows a diagram of spherical aberration in DVD reading, FIG. 12(b) shows a diagram of spherical aberration in MO reading, 12(c) shows a diagram of wave front aberration in DVD reading, and FIG. 12(d) shows a diagram of wave front aberration in MO reading. FIG. 13(a) represents a diagram of relative intensity distribution of converged spot in the case where the best spot form was obtained in reading of DVD, and FIG. 13(b) represents a diagram of relative intensity distribution of converged spot in the case where the best spot form was obtained in reading of MO. In the present example, difference δ between spherical aberration amount SA3 (1) generated on a light flux passing through the first split surface Sd1 at the position of numerical aperture NA3 in recording/reading of MO and spherical aberration amount SA4 (3) generated on a light flux passing through the third split surface Sd3 at the position of numerical aperture NA4 is represented by δ=0.0086 mm.

As is apparent from the foregoing, two optical disks of DVD and MO can be reproduced properly in the present example.

Example 5

Example 5 represents an optical pickup apparatus shown in FIG. 1 wherein 2-area objective lens 16 is provided and DVD is used as the first optical disk and CD is used as the second optical disk.

Table 10 shows paraxial optical data.

TABLE 10

| Media | DVD | CD |
|---|---|---|
| Wavelength | 635 nm | 780 nm |
| Aperture diameter | φ 4.04 | φ 4.04 |
| Lateral magnification of objective lens | m1 = 0 | m2 = −0.0350 |

| I | r | d1 | n1 | d2 | n2 |
|---|---|---|---|---|---|
| 1 | ∞ | 0.00 | 1.0000 | 0.00 | 1.0000 |
| 2 | 2.114 | 2.20 | 1.5383 | 2.20 | 1.5336 |
| 3 | −7.963 | 1.76 | 1.0000 | 1.51 | 1.0000 |
| 4 | ∞ | 0.60 | 1.5800 | 1.20 | 1.5500 |
| 5 | ∞ |  | 1.0000 |  | 1.0000 |

Table 11 shows aspherical surface data.

TABLE 11

Aspherical surface data

| Second surface | First aspherical suface | 0 < H <1.546 (First split surface) | |
|---|---|---|---|
| | | κ = −0.97770 | |
| | | A1 = 0.63761 × 10$^{-3}$ | P1 = 3.0 |
| | | A2 = 0.36688 × 10$^{-3}$ | P2 = 4.0 |
| | | A3 = 0.83511 × 10$^{-2}$ | P3 = 5.0 |
| | | A4 = −0.37296 × 10$^{-2}$ | P4 = 6.0 |
| | | A5 = 0.46548 × 10$^{-3}$ | P5 = 8.0 |
| | | A6 = −0.43124 × 10$^{-4}$ | P6 = 10.0 |
| | Second aspherical surface | 1.546 ≦ H (Third split surface) | |
| | | d2 = 2.20 | |
| | | κ = −0.97360 | |
| | | A1 = 0.59171 × 10$^{-3}$ | P1 = 3.0 |
| | | A2 = 0.42368 × 10$^{-3}$ | P2 = 4.0 |
| | | A3 = 0.82878 × 10$^{-2}$ | P3 = 5.0 |

TABLE 11-continued

Aspherical surface data

| | | A4 = −0.37523 × 10$^{-2}$ | P4 = 6.0 |
|---|---|---|---|
| | | A5 = 0.48773 × 10$^{-3}$ | P5 = 8.0 |
| | | A6 = −0.46503 × 10$^{-4}$ | P6 = 10.0 |
| Third surface | | κ = −0.24914 × 10$^{2}$ | |
| | | A1 = 0.13775 × 10$^{-2}$ | P1 = 3.0 |
| | | A2 = −0.41269 × 10$^{-2}$ | P2 = 4.0 |
| | | A3 = 0.21236 × 10$^{-1}$ | P3 = 5.0 |
| | | A4 = −0.13895 × 10$^{-1}$ | P4 = 6.0 |
| | | A5 = 0.16631 × 10$^{-2}$ | P5 = 8.0 |
| | | A6 = −0.12138 × 10$^{-3}$ | P6 = 10.0 |

Incidentally, "d2 =2.20" in Second aspherical surface in Table 11 indicates a distance on the optical axis from an intersecting point between a form of the second aspherical surface (the third split surface) extended to the optical axis in accordance with the expression of an aspherical surface form and the optical axis to the succeeding surface.

Figure 14:
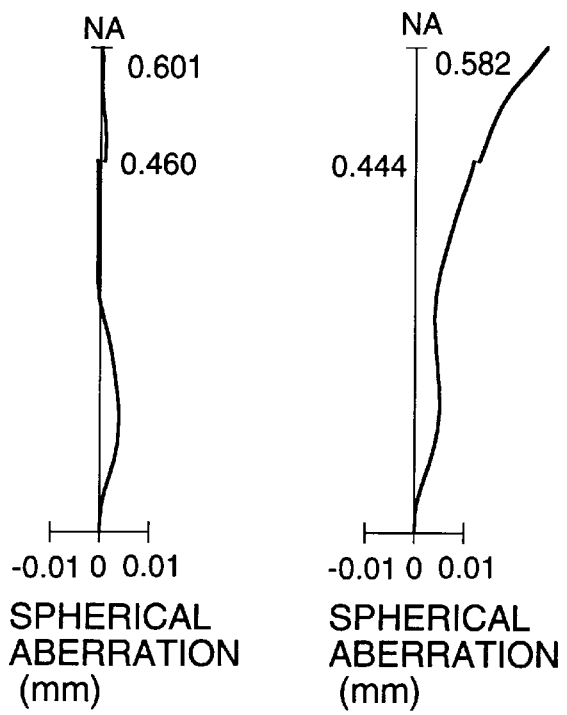
Figure 14:
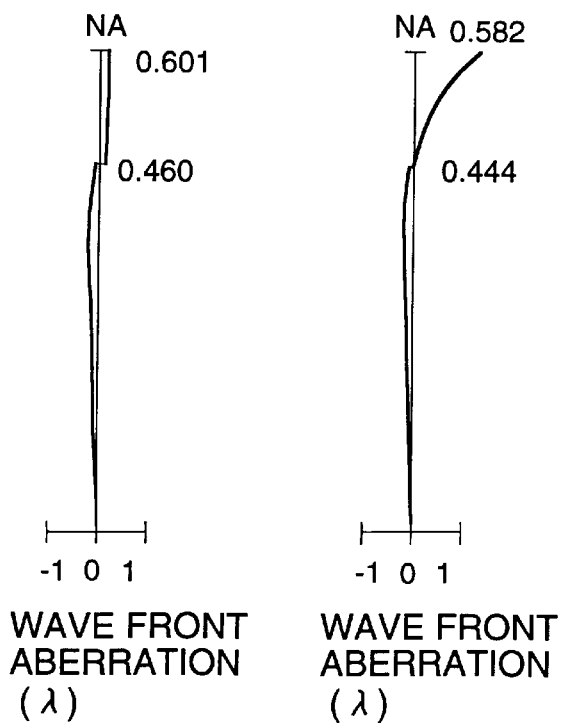

FIG. 14(a) shows a diagram of spherical aberration in DVD reading, FIG. 14(b) shows a diagram of spherical aberration in CD reading, 14(c) shows a diagram of wave front aberration in DVD reading, and FIG. 14(d) shows a diagram of wave front aberration in CD reading. FIG. 15(a) represents a diagram of relative intensity distribution of converged spot in the case where the best spot form was obtained in reading of DVD, and FIG. 15(b) represents a diagram of relative intensity distribution of converged spot in the case where the best spot form was obtained in reading of CD. In the present example, difference δ between spherical aberration amount SA3 (1) generated on a light flux passing through the first split surface Sd1 at the position of numerical aperture NA3 in recording/reading of CD and spherical aberration amount SA3 (3) generated on a light flux passing through the third split surface Sd3 at the position of numerical aperture NA3 is represented by δ=0.0012 mm.

As is apparent from the foregoing, DVD and CD can be reproduced properly in the present example.

Example 6

Example 6 represents an optical pickup apparatus shown in FIG. 1 wherein shielding objective lens 16 is provided and DVD is used as the first optical disk and CD is used as the second optical disk.

Table 12 shows paraxial optical data.

TABLE 12

| Media | DVD | CD |
|---|---|---|
| Wavelength | 635 nm | 780 nm |
| Aperture diameter | φ 4.04 | φ 4.04 |
| Lateral magnification of objective lens | m1 = 0 | m2 = −0.0267 |

| I | r | d1 | n1 | d2 | n2 |
|---|---|---|---|---|---|
| 1 | ∞ | 0.00 | 1.0000 | 0.00 | 1.0000 |
| 2 | 2.114 | 2.20 | 1.5383 | 2.20 | 1.5336 |
| 3 | −7.963 | 1.76 | 1.0000 | 1.48 | 1.0000 |
| 4 | ∞ | 0.60 | 1.5800 | 1.20 | 1.5500 |
| 5 | ∞ |  | 1.0000 |  | 1.0000 |

Table 13 shows aspherical surface data.

TABLE 13

Aspherical surface data

| Second surface | First aspherical surface | $0 < H < 1.546$ (First split surface) $1.680 \leq H$ (Third split surface) $\kappa = -0.97770$ | |
|---|---|---|---|
| | | $A1 = 0.63761 \times 10^{-3}$ | $P1 = 3.0$ |
| | | $A2 = 0.36688 \times 10^{-3}$ | $P2 = 4.0$ |
| | | $A3 = 0.83511 \times 10^{-2}$ | $P3 = 5.0$ |
| | | $A4 = -0.37296 \times 10^{-2}$ | $P4 = 6.0$ |
| | | $A5 = 0.46548 \times 10^{-3}$ | $P5 = 8.0$ |
| | | $A6 = -0.43124 \times 10^{-4}$ | $P6 = 10.0$ |
| Third surface | | $\kappa = -0.24914 \times 10^2$ | |
| | | $A1 = 0.13775 \times 10^{-2}$ | $P1 = 3.0$ |
| | | $A2 = -0.41269 \times 10^{-2}$ | $P2 = 4.0$ |
| | | $A3 = 0.21236 \times 10^{-1}$ | $P3 = 5.0$ |
| | | $A4 = -0.13895 \times 10^{-1}$ | $P4 = 6.0$ |
| | | $A5 = 0.16631 \times 10^{-2}$ | $P5 = 8.0$ |
| | | $A6 = -0.12138 \times 10^{-3}$ | $P6 = 10.0$ |

Figure 16:
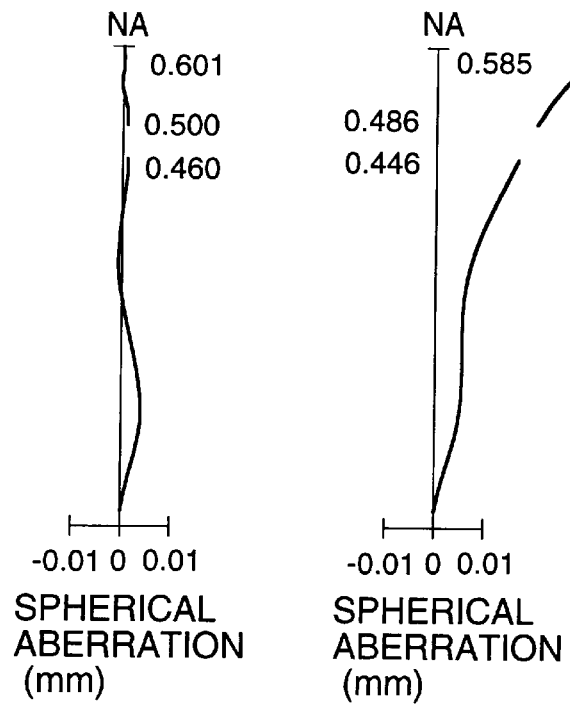
Figure 16:
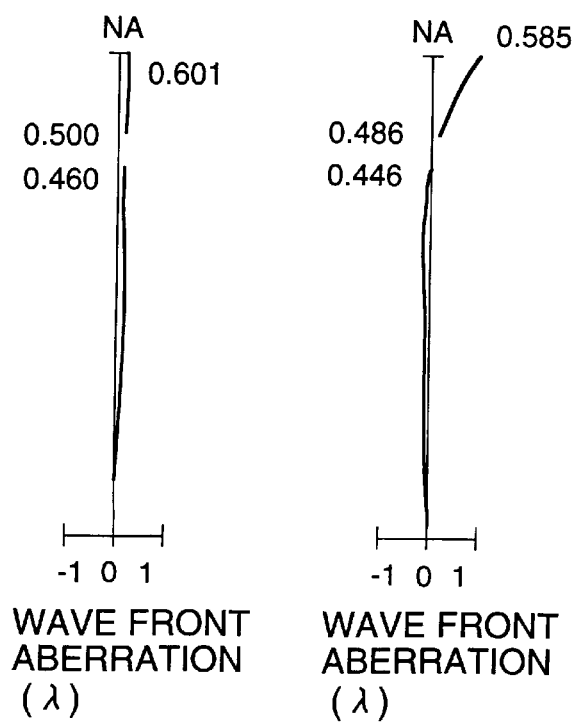
Figure 17:
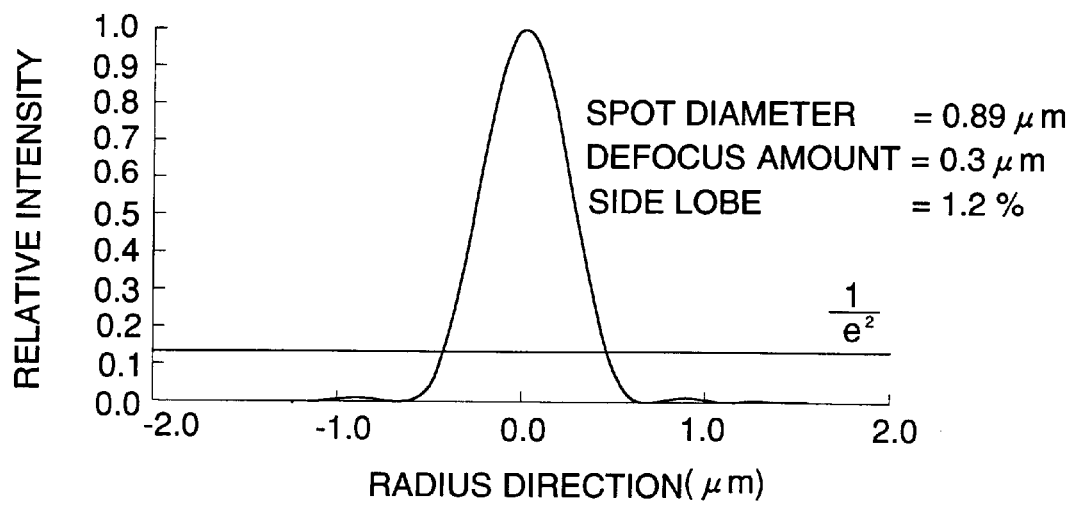
Figure 17:
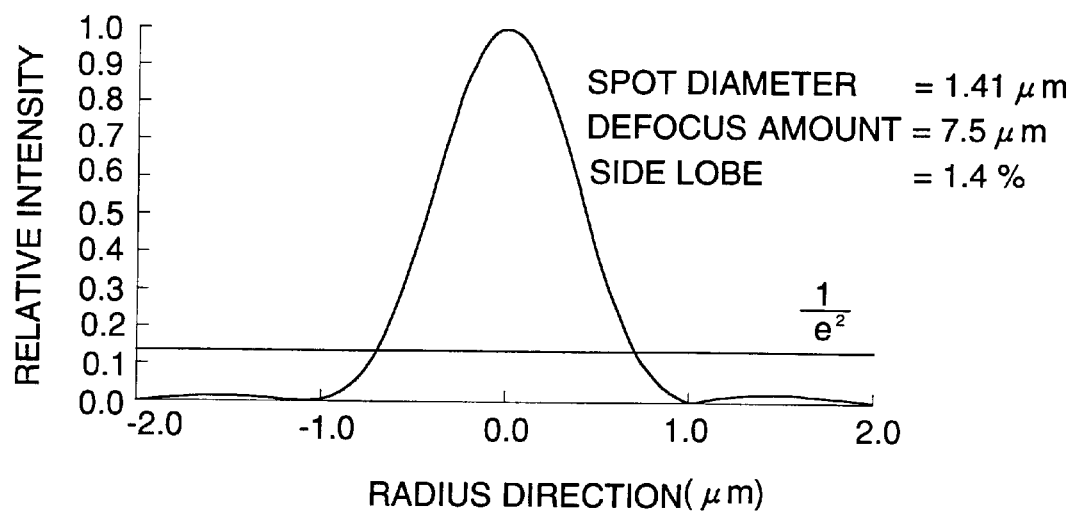

FIG. 16(*a*) shows a diagram of spherical aberration in DVD reading, FIG. 16(*b*) shows a diagram of spherical aberration in CD reading, 16(*c*) shows a diagram of wave front aberration in DVD reading, and FIG. 16(*d*) shows a diagram of wave front aberration in CD reading. FIG. 17(*a*) represents a diagram of relative intensity distribution of converged spot in the case where the best spot form was obtained in reading of DVD, and FIG. 17(*b*) represents a diagram of relative intensity distribution of converged spot in the case where the best spot form was obtained in reading of CD. In the present example, difference δ between spherical aberration amount SA3 (1) generated on a light flux passing through the first split surface Sd1 at the position of numerical aperture NA3 in recording/reading of CD and spherical aberration amount SA4 (3) generated on a light flux passing through the third split surface Sd4 at the position of numerical aperture NA3 is represented by δ=0.0034 mm.

As is apparent from the foregoing, DVD and CD can be reproduced properly in the present example.

An example of the invention will be explained as follows. The present example is represented by the first embodiment stated above wherein a working distance is constant. Let it be assumed that DVD (transparent base board thickness t1=0.6 mm, necessary numerical aperture NA1=0.60 (wavelength λ=635 nm for the first semiconductor laser 11)) is used as the first optical disk, and CD (transparent base board thickness t2=1.2 mm, necessary numerical aperture NA2=0.45 (λ=780 nm)) is used as the second optical disk.

Table 1 shows lens data.

TABLE 14

| Surface No. | r | d (λ = 635 nm) | n (λ = 635 nm) | d (λ = 780 nm) | n (λ = 780 nm) |
|---|---|---|---|---|---|
| 0 (Light-emitting point) | | 15.154 | 1.0 | 6.99 | 1.0 |
| 1 | 117.284 | 1.4 | 1.5383 | 1.4 | 1.5336 |
| 2 | −9.257 | 6.0 | 1.0 | 6.0 | 1.0 |
| 3 (aperture) | ∞ | 0.0 | 1.0 | 0.0 | 1.0 |
| 4 | 1.638 | 1.7 | 1.5383 | 1.7 | 1.5336 |
| 5 | −6.793 | 1.3 | 1.0 | 1.3 | 1.0 |
| 6 (disk) | ∞ | 0.6 | 1.58 | 1.2 | 1.55 |
| 7 | ∞ | | | | |

In Table 14, light-emitting points of the first and second semiconductor lasers are assumed to be the 0-th surface which is followed by surfaces arranged in the light advancing direction up to an information recording surface of an optical disk including i-th surface representing an arbitrary surface (provided, however, that divergence changing optical element 13 represents the first and second surfaces and objective optical element 16 represents the fourth and fifth surfaces, because changing means 25 and 26 as well as composing means 19 are omitted). Further, r represents a radius of curvature of the surface intersecting an optical axis, d represents a distance between the i-th surface and the (i+1)th surface, and n represents a refractive index under the condition of the wavelength of a light flux of a semiconductor laser to be used. Incidentally, the sign which is positive represents the light advancing direction.

Focal length of divergence changing optical element 13 f=16.0 mm.

Focal length of objective optical element 16 f=2.64 mm.

Focal length of a converging optical system f=3.43 mm.

Image forming magnification m1 of a converging optical system for a light flux emitted from the first semiconductor laser 11=−1/6.06.

Image forming magnification m2 of a converging optical system for a light flux emitted from the second semiconductor laser 12=−1/3.65.

Therefore, m1>m2.

Table 15 shows aspherical surface data of he surface where an aspherical surface is used among the aforesaid surfaces.

TABLE 15

| Second surface | $K = -0.70672$ | | | |
|---|---|---|---|---|
| Fourth surface | $K = -0.10810 \times 10^1$ | | | First split surface |
| | $A1 = 0.67031 \times 10^{-2}$ | $P1 = 3.0$ | | $(0 < H < 1.47$ nm$)$ |
| | $A2 = -0.42797 \times 10^{-2}$ | $P2 = 4.0$ | | Radius of curvature = |
| | $A3 = 0.23602 \times 10^{-1}$ | $P3 = 5.0$ | | 1.638 |
| | $A4 = -0.76855 \times 10^{-2}$ | $P4 = 6.0$ | | |
| | $A5 = 0.48711 \times 10^{-4}$ | $P5 = 8.0$ | | |
| | $A6 = 0.46208 \times 10^{-3}$ | $P6 = 10.0$ | | |
| | $K = -0.12836 \times 10^1$ | | | Second split surface |
| | $A1 = 0.62906 \times 10^{-2}$ | $P1 = 3.0$ | | $(1.47$ mm $< H < 1.53$ mm$)$ |
| | $A2 = 0.12809 \times 10^{-2}$ | $P2 = 4.0$ | | Radius of curvature = |
| | $A3 = 0.22997 \times 10^{-1}$ | $P3 = 5.0$ | | 1.638 |
| | $A4 = -0.97278 \times 10^{-2}$ | $P4 = 6.0$ | | |
| | $A5 = 0.14686 \times 10^{-2}$ | $P5 = 8.0$ | | |
| | $A6 = 0.12773 \times 10^{-3}$ | $P6 = 10.0$ | | |
| | $K = -0.10810 \times 10^1$ | | | Third split surface |
| | $A1 = 0.67031 \times 10^{-2}$ | $P1 = 3.0$ | | $(1.53$ mm $< H < 1.64$ mm$)$ |
| | $A2 = -0.42797 \times 10^{-2}$ | $P2 = 4.0$ | | Radius of curvature = |
| | $A3 = 0.23602 \times 10^{-1}$ | $P3 = 5.0$ | | 1.638 |
| | $A4 = -0.76855 \times 10^{-2}$ | $P4 = 6.0$ | | |
| | $A5 = 0.48711 \times 10^{-4}$ | $P5 = 8.0$ | | |
| | $A6 = 0.46208 \times 10^{-3}$ | $P6 = 10.0$ | | |
| Fifth surface | $K = -0.11225 \times 10^2$ | | | |
| | $A1 = 0.80457 \times 10^{-2}$ | $P1 = 3.0$ | | |
| | $A2 = -0.78604 \times 10^{-2}$ | $P2 = 4.0$ | | |
| | $A3 = 0.53359 \times 10^{-1}$ | $P3 = 5.0$ | | |
| | $A4 = -0.41948 \times 10^{-1}$ | $P4 = 6.0$ | | |
| | $A5 = 0.13052 \times 10^{-1}$ | $P5 = 8.0$ | | |
| | $A6 = -0.24357 \times 10^{-2}$ | $P6 = 10.0$ | | |

Incidentally, the following is one on which the expression of an aspherical surface is based.

$$X = (H^2/r) / \left[1 + \sqrt{1 - (1+K)(H/r)^2}\right] + \sum_j A_j H^{P_j}$$

In the expression above, X represents an axis in the direction of an optical axis, H represents an axis in the direction perpendicular to the optical axis, the sign which is positive represents the light advancing direction, K represents the constant of the cone, Aj represents a coefficient of an aspherical surface, and Pj represents the power number of an aspherical surface.

FIG. 22(a) shows spherical aberration on the information recording surface in the case of recording/reading of DVD, and FIG. 22(b) shows spherical aberration on the information recording surface in the case of recording/reading of CD. FIG. 23(a) shows a diagram of relative intensity distribution wherein a converged spot is of the best spot form in recording/reading of DVD and FIG. 23(b) shows a diagram of relative intensity distribution wherein a converged spot is of the best spot form in recording/reading of CD.

In the present example, recording/reading for both DVD and CD can be conducted properly, WD in the case of DVD is the same as that in the case of CD, excessive power consumption as a bias is not required for two-dimensional actuator 15, and a movable range of objective optical element 16 moved by the two-dimensional actuator 15 does not need to be broadened, which makes an apparatus compact.

In the invention, as stated above, recording/reading for plural optical information recording media each having a different thickness of a transparent base board can be conducted by a single converging optical system, coping also with high NA, and even in the case of the second optical disk with high NA, recording/reading can be conducted as properly as in the first optical disk.

Further, in the present invention, it is possible to conduct recording/reading, with a single converging optical system, for optical disks each having a different thickness of a transparent base board, which makes it possible to provide a compact optical pickup apparatus which has interchangeability and simple structure, and requires less power consumption.

What is claimed is:

1. An optical pickup apparatus for reading information from one of different kinds of optical information recording media, each medium having a transparent base board of a different thickness, or for recording information onto one of said different kinds of optical information recording media, the apparatus comprising:

a laser light source;

a light converging optical system for converging luminous flux from said laser light source through said transparent base board of said optical information recording medium onto an information recording surface of said optical information recording medium;

wherein said light converging optical system includes an objective lens and divides a light flux from said laser light source into a light flux of a first region, being closest to an objective lens optical axis, a light flux of a second region, being outside of said first region, and a light flux of a third region, being outside of said second region in a direction perpendicular to a laser optical axis; said different kinds of optical information recording media include a first optical information recording medium, having a transparent base board with a thickness of t1, and a second optical information recording medium, having a transparent base board with a thickness of t2 wherein t2 is larger than t1; and a magnification m2 of said objective lens, viewed from a second optical information recording medium side in a recording or reading operation, is smaller than a than a magnification m1 of said objective lens, viewed from a first optical information recording medium side in a recording or reading operation information; and said light flux of said first region is used for recording or reading information of said first optical information recording medium and said second optical information recording medium and said light flux of said third region is used for recording or reading information of said first optical information recording medium; and wherein said light flux of said first region, said light flux of said second region and said light flux of said third region are substantially coaxial with the objective lens optical axis.

2. The optical pickup apparatus of claim 1, wherein an angle of divergence of a light flux incident on said objective lens is varied so that the magnification of said objective lens, viewed from said first optical information recording medium side in a recording or reading operation, is defined as m1 and the magnification of said objective lens, viewed from said second optical information recording medium side in a recording or reading operation of, is defined as m2.

3. The optical pickup apparatus of claim 2, wherein an angle of divergence of a light flux, incident on said objective lens, in a recording or reading operation on said second optical information recording medium is made larger than an angle of divergence of a light flux, incident on said objective lens, in a recording or reading operation on said first optical information recording medium so that the magnification m2 of said objective lens, viewed from said second optical information recording medium side in a recording or reading operation, is smaller than the magnification m1 of said objective lens, viewed from said first optical information recording medium side in a recording or reading operation.

4. The optical pickup apparatus of claim 1, wherein an optical path length between said laser light source and said objective lens is varied so that the magnification of said objective lens, viewed from said first optical information recording medium side in a recording or reading operation, is defined as m1 and the magnification of said objective lens, viewed from said second optical information recording medium side in a recording or reading operation, is defined as m2.

5. The optical pickup apparatus of claim 1, wherein said light converging optical system includes a divergence changing optical element for changing an angle of divergence for a light flux from said laser light source wherein an optical path length, between said laser light source and said divergence changing optical element, in a recording or reading operation on said second optical information recording medium is made shorter than an optical path length, between said laser light source and said divergence changing optical element, in a recording or reading operation on said first optical information recording medium so that the magnification m2 of said objective lens, viewed from said second optical information recording medium side in a recording or reading operation, is smaller than the magnification m1 of said objective lens, viewed from said first optical information recording medium side in a recording or reading operation.

6. The optical pickup apparatus of claim 5, wherein said laser light source includes a first laser light source for recording or reading information of said first optical information recording medium and a second laser light source for recording or reading information of said second optical information recording medium; and an optical path length, between said second laser light source and said divergence changing optical element, is made shorter than an optical path length, between said first laser light source and said divergence changing optical element, so that the magnification m2 of said objective lens, viewed from said second optical information recording medium side in a recording or reading operation, is smaller than the magnification m1 of said objective lens, viewed from said first optical information recording medium side in a recording or reading operation.

7. The optical pickup apparatus of claim 5, wherein an optical path length, between said laser light source and said divergence changing optical element, in a recording or reading operation on said second optical information recording medium is made shorter than an optical path length, between said laser light source and said divergence changing optical element, in a recording or reading operation on said first optical information recording medium by moving said laser light source or said divergence changing optical element in the optical axis direction so that the magnification m2 of said objective lens, viewed from said second optical information recording medium side in a recording or reading operation, is smaller than the magnification m1 of said objective lens, viewed from said first optical information recording medium side in a recording or reading operation.

8. The optical pickup apparatus of claim 1, wherein said light fluxes of said first region and said third region are used for recording or reading information of said first optical information recording medium and said light fluxes of said first region and said second region are used for recording or reading information of said second optical information recording medium.

9. The optical pickup apparatus of claim 1, wherein said light converging optical system includes at least one surface having a lens surface splitting section, which is substantially coaxial with the objective lens optical axis, for making a wave front aberration of said light converging optical system discontinuous; and a light flux from said laser light source is made through said surface having said lens surface splitting section so that said light flux from said laser light source is divided into light fluxes of at least two regions in a direction perpendicular to the laser optical axis.

10. The optical pickup apparatus of claim 9, wherein two lens surface splitting sections are provided in said light converging optical system; and a surface, where said lens surface splitting sections are provided, is divided to a first region, being closest to the optical axis, a second region, being outside of said first region, and a third region, being outside of said second region.

11. The optical pickup apparatus of claim 10, wherein said second region is formed as a shielding structure.

12. The optical pickup apparatus of claim 1, wherein said magnification m2 is for compensating spherical aberration caused by a difference between said thickness t1 of said transparent base board of said first optical information recording medium and said thickness t2 of said transparent base board of said second optical information recording medium.

13. The optical pickup apparatus of claim 1, wherein said magnification m1 and said magnification m2 satisfy the following formula:

$$-0.05 < m2-m1 < -0.005.$$

14. The optical pickup apparatus of claim 1, wherein wave front aberration of each of beam spots formed on an information recording surface of said first optical information recording medium is not more than 0.05 $\lambda$1(rms); and wave front aberration of each of beam spots formed on an information recording surface of said second optical information recording medium is not more than 0.07 $\lambda$2(rms).

15. The optical pickup apparatus of claim 1, wherein a distance, between a last refraction surface which is a refraction surface of said light converging optical system closest to said first optical information recording medium and said transparent base board of said first optical information recording medium when recording or reading information of said first optical information recording medium, is approximately equivalent to a distance, between said last refraction surface and said transparent base board of said second optical information recording medium when recording or reading information of said second optical information recording medium.

16. The optical pickup apparatus of claim 15, wherein said laser light source includes a first laser light source for recording or reading information of said first optical information recording medium and a second laser light source for recording or reading information of said second optical information recording medium; and said first laser light source and said second laser light source are arranged so that said distance, between said last refraction and said transparent base board of said first optical information recording medium when recording or reading information of said first optical information recording medium, is approximately equivalent to said distance, between said last refraction surface and said transparent base board of said second optical information recording medium when recording or reading information of said second optical information recording medium.

17. The optical pickup apparatus of claim 15, wherein said laser light source is movable in the laser optical axis direction; and a position of said laser light source is changed so that said distance, between said last refraction and said transparent base board of said first optical information recording medium when recording or reading information of said first optical information recording medium, is approximately equivalent to said distance, between said last refraction surface and said transparent base board of said second optical information recording medium when recording or reading information of said second optical information recording medium.

18. The optical pickup apparatus of claim 1, satisfying the following formula:

$$|(m2-m1)f-t1/n1+t2/n2|<0.25 \text{ (mm)}$$

wherein f is focal length (mm) of said light converging optical system, n1 is a refractive index of said transparent base board of said first optical information recording medium for a wavelength of said laser light source in a recording or reading operation of said first optical information recording medium, and n2 is a refractive index of said transparent base board of said second optical information recording medium for a wavelength of said laser light source in a recording or reading operation of said second optical information recording medium.

19. The optical pickup apparatus of claim 18, satisfying the following formula:

$$|(m2-m1)f-t1/n1+t2/n2|<0.15 \text{ (mm)}.$$

20. The optical pickup apparatus of claim 1, wherein a required numerical aperture of said objective lens, at the side of said second optical information recording medium, for performing recording or reading of information on said second optical information recording medium is NA2; and a spherical aberration of said objective lens is discontinuously changed at at least two aperture positions in vicinity of a numerical aperture corresponding to said NA2.

21. The optical pickup apparatus of claim 20, wherein said at least two aperture positions includes the smallest numerical aperture of NAL and the largest numerical aperture of NAH; and the spherical aberration of said objective lens is discontinuously changed to the reverse direction between NAL and NAH.

22. The optical pickup apparatus of claim 21, wherein the spherical aberration of said objective lens at a numerical aperture between NAL and NAH is in the opposite sign side of a numerical aperture other than the one between NAL and NAH when recording or reading of information on said second optical information recording medium is performed.

23. The optical pickup apparatus of claim 1, wherein a required numerical aperture of said objective lens, at the side of said second optical information recording medium, for performing recording or reading of information on said second optical information recording medium is NA2; and the spherical aberration of said objective lens is made different at at least two aperture positions in a vicinity of a numerical aperture corresponding to said NA2.

24. The optical pickup apparatus of claim 15, wherein a position of said light converging optical system in the optical axis, when recording or reading of information on said first optical information recording medium is performed, is the same as that when recording or reading of information on said second optical information recording medium is performed.

25. The optical pickup apparatus of claim 1, wherein said light converging optical system includes at least one surface having a lens surface splitting section, which is substantially coaxial with the objective lens optical axis, for making a wave front aberration of said light converging optical system discontinuous; a light flux from said laser light source is made through said surface having said lens surface splitting section so that said light flux from said laser light source is divided into a light flux of a first region, being closest to the objective lens optical axis, a light flux of a second region, being outside of said first region, and a light flux of a third region, being outside of said second region in a direction perpendicular to the laser optical axis; wave front aberration of each of beam spots formed with said light fluxes of said first region and said third region on an information recording surface of said first optical information recording medium is not more than 0.05 $\lambda 1$(rms) when reading or recording of information is performed on said first optical information recording medium; and wave front aberration of each of beam spots formed with said light flux of said first region on an information recording surface of said second optical information recording medium is not more than 0.07 $\lambda 2$(rms) when reading or recording of information is performed on said second optical information recording medium.

26. The optical pickup apparatus of claim 1, wherein said light flux of said second region is used for recording or reading information of said second optical information recording medium.

27. The optical pickup apparatus of claim 1, wherein a spherical aberration of said light converging optical system of said light flux of said second region and a spherical aberration of said light converging optical system of said light flux of said first region are discontinuous.

28. The optical pick-up apparatus of claim 1, wherein a spherical aberration of said light converging optical system of said light flux of said second region and a spherical aberration of said light converging optical system of said light flux of said third region are discontinuous.

* * * * *

UNITED STATES PATENT AND TRADEMARK OFFICE
CERTIFICATE OF CORRECTION

PATENT NO. : 6,192,021 B1
DATED : February 20, 2001
INVENTOR(S) : Shinichiro Saito et al.

It is certified that error appears in the above-identified patent and that said Letters Patent is hereby corrected as shown below:

Title page,
Item [54], after "APPARATUS", insert -- FOR READING OR RECORDING INFORMATION OF AN OPTICAL INFORMATION RECORDING MEDIUM --.

Column 37, claim 1,
Line 67, after "smaller", delete "than a".

Column 38, claim 1,
Line 3, after "operation", delete "information".

Column 38, claim 2,
Line 21, after "operation", delete "of".

Signed and Sealed this

Twenty-second Day of January, 2002

Attest:

*Attesting Officer*

JAMES E. ROGAN
*Director of the United States Patent and Trademark Office*